(12) United States Patent
Faulkner et al.

(10) Patent No.: US 7,654,826 B2
(45) Date of Patent: Feb. 2, 2010

(54) THREE-DIMENSIONAL CARTOGRAPHIC USER INTERFACE SYSTEM

(75) Inventors: Lawrence Q. Faulkner, Fillmore, CA (US); Mark E. Fisher, Moorpark, CA (US); Justin Luton, Simi Valley, CA (US)

(73) Assignee: Solid Terrain Modeling, Fillmore, CA (US)

( * ) Notice: Subject to any disclaimer, the term of this patent is extended or adjusted under 35 U.S.C. 154(b) by 531 days.

(21) Appl. No.: 11/244,012

(22) Filed: Oct. 4, 2005

(65) Prior Publication Data

US 2006/0075356 A1 Apr. 6, 2006

Related U.S. Application Data

(60) Provisional application No. 60/615,246, filed on Oct. 4, 2004.

(51) Int. Cl.
*G09B 25/06* (2006.01)
(52) U.S. Cl. ........................................ 434/130; 434/150
(58) Field of Classification Search ................. 434/130, 434/150
See application file for complete search history.

(56) References Cited

U.S. PATENT DOCUMENTS 4,951,151 A * 8/1990 Sorenson et al. ............ 348/744
5,657,552 A * 8/1997 Reineck et al. ............... 33/784
5,954,517 A * 9/1999 Hagenlocher ............... 434/365
6,215,498 B1 * 4/2001 Filo et al. .................... 345/419
2001/0027456 A1 * 10/2001 Lancaster et al. ........ 707/104.1

\* cited by examiner

*Primary Examiner*—Cameron Saadat
(74) *Attorney, Agent, or Firm*—Reed Smith LLP

(57) ABSTRACT

A three-dimensional cartographic computer user interface system for enhancing geo-spatial comprehension and geographic information system user interactivity is disclosed. The system has at least one computer and operating system, user input means, and at least one positionable projection display means, including storage, retrieval and playback control means for the projected content. The system has user input device software responsive to input from at least one user input device which is operable on a three-dimensional user interface surface of the system, and software for the display and control of cartographic-related projected imagery, and software for the display and control of three-dimensional user interface-related content superimposed within the cartographic-related projected imagery. The system includes at least one cartographic map having at least one surface portion which is three-dimensionally shaped to represent topographic terrain of at least one geographical location and optionally includes a substantially planar surface onto which cartographic-related content is projected.

72 Claims, 10 Drawing Sheets

THREE-DIMENSIONAL CARTOGRAPHIC USER INTERFACE SYSTEM

CROSS-REFERENCE TO PATENT APPLICATIONS

The present application is a non-provisional patent application which relies on provisional patent application 60/615,246 filed on Oct. 4, 2004, and is related to patent applications 60/195,129 and 60/195,130 both filed on Apr. 6, 2000, the complete disclosures of which are hereby incorporated by reference.

FIELD OF THE INVENTION

The present invention pertains to the field of cartography. It is generally directed to geographic information systems ('GIS') that are interactive with one or more users through computer user interfaces and input devices, computer software responsive to input from such devices, and computer display systems for displaying visual feedback in relation to user-input by one or more users. More particularly, the invention relates to a three-dimensional cartographic user interface system (hereinafter referred to as '3D-CUI') having one or more input-device drivers and cartographic-related or Geo-based software which are responsive to user-input from the 3D-CUI such that user input device feedback relative to cartographic-related imagery or content is displayed on a surface of the 3D-CUI according to input made by one or more users of the system.

BACKGROUND OF THE INVENTION

In the past, the prior art attempted to convey three dimensional cartographic information either with (a) two dimensional maps, or (b) crudely made, 'cut-out' or stair-step-layered topographical maps that were not suited to having accurate and properly registered high resolution printing done on them. 2D maps required the additional time and effort of a viewer to first translate the 2D terrain or environment information into a 3D understanding in their imagination. This usually meant that anyone trying to understand the salient map or environment information and the context of that information, had to be very familiar with the reading of 2D maps. Since there are many situations where the clear comprehension of cartographic information would be valuable to both expert map readers and to those less adept at map reading, and often important to convey such information quickly, succinctly and accurately, it would be optimal to not have to rely on a 2D deciphering of maps. While the stair-step-layered appearance of 3D map renderings facilitated a better comprehension of 3D topography, they were not suited, due to their jagged profiles, for either (a) the movement or positioning of one or more computer input devices on or over such stair-step surfaces, or (b) the projection of cartographic content onto such surfaces. For example, in the latter case, if one or more projectors were projecting cartographic imagery onto a topographical map comprised of 'cut-out' or 'stair-stepped' contours, and one was viewing that map from a side view, all projected imagery would appear only on the uppermost horizontal flat surfaces (representing an averaged elevation) and would not appear on the vertical edges of each topographical contour. Thus, significant deficiencies were unavoidable with previous 3D cartographic maps because large portions of the maps could not show any projected or printed imagery or cartographic content on them at all, which thereby significantly inhibited geo-spatial comprehension.

In co-pending patents by the inventors of the present invention, a system for creating highly accurate three-dimensional topographical maps and for printing and accurately registering high-resolution full color imagery, text, indicia and the like on the surfaces of the 3D maps has been achieved. The advancement of the cartographic art is evidenced by the featured display of dozens of their 3D maps as a cornerstone, ongoing exhibit at the National Geographic museum and headquarters in Washington D.C. This innovative approach to 3D map-making has set a new standard in the field of cartography. While the maps are visually striking in appearance, and highly accurate in their registration and representation of map-related imagery, content and information, they have also gained popularity and wide acceptance in the field of cartography because of the ease in which comprehension of a three dimensional terrain or environment can be quickly assimilated by anyone viewing the new maps.

In addition to increased comprehension by the viewer, it would be advantageous to allow the user to effectively interact with the map. For any location on a map, there is a multitude of information that can be displayed on the map that would pertain to that particular location. The type of information that should be displayed for a given location depends greatly on the desires of the user. It would be advantageous to allow for the user to be able to indicate the types of information to be displayed for a particular geographical location on the map and have that display change to accommodate the user. It would also be advantageous if the user interacts directly with the map in expressing his indications through appropriate user interface menus.

BRIEF SUMMARY OF THE INVENTION

The present invention is a computer-equipped interactive cartographic system for (a) facilitating enhanced Geo-spatial comprehension of a geographical location, area or region and (b) facilitating a three-dimensional '3D' user interactivity via the system's 3D-CUI. When a user provides input from an input device of the system, at any two-dimensional '2D' or 3D location on the surface of the 3D-CUI, a display means of the system simultaneously projects, or otherwise displays, viewable content corresponding to the user's input. Preferably the viewable content pertains to information and/or one or more conditions relating to a geographical location and can include information or data hereinafter referred to as cartographic-related content including, but not limited to, any one or more among the following types or categories: alphanumeric; graphic; pictorial; vector-based; rasterized; topographic; cartographic; geo-spatial; geologic; geographic; oceanographic; distance-related; measurement-related; mineral or fuel related; slope-related; altitude-related; map legend; environment-related; atmospheric-related; computer-generated; emergency or hazard-specific data; fire-specific; flood or spill-specific; avalanche-specific; battle-specific data; location-specific data; latitude and longitude data; civil engineering-related; GPS-related data; GIS-related; Geo-spatial; coordinate data; point of view 'POV' or angle of view or heading data; bearing or azimuth data; elevation-specific; computer-generated simulation, analysis or computational data; view shed related data or analysis; land development or management; waste or hazardous waste management; augmented reality 'AR' content, data or information; legal and liability-related data or information; map signs, symbols or abbreviations (e.g., military or non-military); paleontology-related; archeology-related; recreation-related; survey-related; inspectorate-related; indicia; and the like.

The system will typically include at least one computer, at least one user-input device and respective device driver, at least one cartographic-related software application responsive to user input from at least one input device having position monitoring and reporting means, at least one computer display means, and a 3D-CUI which includes a three dimensional topographical surface contour representative of at least one geographical location. User-input devices of the 3D-CUI system can optionally include any among a variety of commercially-available devices including, but not limited to, trackballs, CAD-program input devices, trackpads, and the like. When more than one input device is provided, the system is responsive to input from the devices including when operated by more than one user.

Preferably, the 3D-CUI display means is a projector positioning means which positions one or more projectors in a position to project cartographic-related content, and is equipped to size and properly register projected imagery onto an upper surface of one or more 3D maps, wherein, the map(s) is mounted on an upper portion of a map positioning means such as a map pedestal. The map positioning means positions the one or more cartographic maps in an orientation for being viewed by and facilitating interactivity with at least one user. Preferably, the system includes software means for ortho-rectifying imagery which is projected onto the 3D-CUI. Such software can include one or more commercially-available mapping or visualization software programs.

Alternatively, one or more map surfaces can be comprised of, or incorporate, a flexible pixelated material capable of conforming to or being formed into the 3D shape of a topographical map surface and which displays content in a manner similar to that of a computer LCD type of screen. Optionally, one or more map surfaces can be comprised of, or incorporate, a projection screen material, LCD screen, LED screen, plasma screen, or other planar pixelated material which displays content in a manner similar to that of a computer LCD or television screen. Preferably, the screen material is recessed into an upper surface of at least one map to appear flush with the surface or is bordered by a contoured frame. Optionally, the pixelated material can also include position-sensing means or touch-sensitive sensing means so that a user can interact with the screen surface as a user input device in a manner similar to that of functionality provided by commercially available touch-sensitive computer screens.

The 3D-CUI accommodates user input from one or more input devices physically connected to, or wirelessly communicating with, the computer(s), including but not limited to: stylus(es), physical pointing device(s), laser, or other light-emitting pointer(s), input devices with infrared motion-sensing means, computer mouse or mice, positionable physical objects or geo-spatial data simulation object(s) (hereinafter referred to as 'GSDSO'), and the like. The GSDSO can be actual physical objects from which a user can provide input, or alternatively can be a graphical representation of a GSDSO, interface element, or other software 'object' which is positionable and displayable on a surface of the 3D-CUI and from which a user can interact with using an input device, to control one or more GSDSO parameters. Physical GSDSO devices optionally include (and have a respective device driver responsive to user input from) one or more switches, and/or potentiometers, and/or slideable switches or finger positionable data input wheels, for providing switchable and/or variable user data input. Additionally, or alternatively, one or more controllable members of the physical GSDSO can be equipped with electro-mechanical actuating means such as control linkage controllable by a servo or stepper motor which is responsive to user control input entered into an optional software program of the system which sends control signal to motion-control electronics having a communications link with the servo or motor.

Visual feedback of user input can be displayed on a surface of the 3D-CUI in response to the device input made by one or more users. Preferably, the system projects or otherwise displays a graphical representation of one or more user selectable software tools, or tool palettes, on a 2D or 3D topographical surface of the 3D-CUI and does so (a) continuously or (b) in response to a switchable or variable input made on an input device by a user. Switchable and/or variable input made by a user interacting with an input device while the device is positioned over a predetermined area of a graphically depicted tool or area of a palette can cause any in a variety of software outcomes to occur. For example, switchable, variable or predetermined movement input from an input device can result in the selection of a known software routine associated with a particular graphically displayed tool or tool of a palette; or device input can result in a user-selectable choice among software menu items, such as in a manner conventionally provided when making a user-selection from a graphically depicted pop-up or drop-down menu. In the latter case, the user selection of a menu item can also cause the displaying of one or more other graphically depicted windows, sub-menus or palettes, from which switchable or variable control of one or more user-configurable software parameters can be entered or modified. Thus, graphical representations of one or more user-selectable software menus and/or sub-menus are projectable onto a surface portion of one or more cartographic maps of the system, whereby user interactivity within the graphical representation(s) with at least one input device executes at least one software routine.

Input device choices can also include a graphically displayed user-interface selection wherein a graphical representation of an alpha-numeric keyboard and/or numeric pad is projected onto a surface portion of the 3D-CUI from which user input device interaction within the graphical representation provides for the entry of a sequence of text and/or numbers. Preferably an alpha-numeric text entry mode having text-modifying choices is provided. The text-modifying can include user-selectable choices such as: text-sizing, text-justifying, text-coloring, and a choice of text characteristics such as bold, italic, underlined text, and the like. The placement of text on the 3D-CUI surface can be achieved by a user selecting a text-entry mode among software choices displayed in the 3D-CUI, pointing the cursor to a desired 3D-CUI location then clicking an input device button to initiate the text-entry at the selected location. Preferably a blinking vertical line is projected at the user-selected location, representing the entry position of the text and indicating that text can be entered by a user. With the text-entry field so initiated, the user can optionally use the projected keyboard and/or keypad by pointing a projected cursor to, and clicking on each desired letter or number as needed, thus providing for the input of indicia at any desired location on the 3D-CUI. Preferably, one or more selectable software tools, or tool palettes, are positionable on the 3D topographical surface of the 3D-CUI by a user, for example, when a predetermined area of a graphically represented tool or palette is both clicked on by an input device and dragged in a conventional 'Click-and-Drag' manner to a desired location of the 3D-CUI. Such graphically represented tool or palette can take the form of knobs, slideable elements and/or buttons. The input device(s) can also be employed for other conventional types of Click-and-Drag and/or drawing functions, for example, for drawing, or creating alphanumeric notations, or establishing or modifying one or more adjustable software parameter ranges, settings, and the like. Optionally, the system also has at least one input device-position monitoring and reporting means which also includes input device-attitude monitoring and reporting means, for example to monitor and be responsive to yaw, or pitch, or roll input received from an input device, or any combination thereof.

Thus the system provides a three dimensional cartographic surface representing a geographical area which also functions as both an interactive 3D user interface and a 3D graphical display. Cartographic-related software of the system is controllable by one or more users, each employing an input device. The system regularly monitors the input device(s) for user-inputted events and for input device positioning and/or cursor positioning relative to the 3D-CUI represented geographical area.

The present invention also addresses the shortcomings of the prior art by providing a 3D-CUI system comprising a highly accurate, 3D topographical surface representing a geographical area, which is contiguously shaped having a true-to-nature appearance with a realistic 3D scale. Alternatively, the 3D-CUI can have a requested scale exaggeration, for example, to exaggerate elevation changes in a map's topography. In either case, an uninterrupted contiguously shaped surface of the 3D-CUI, whether representing elevation changes accurately, or with scale exaggeration, provides for the sliding, or easy positioning, of one or more input devices accurately, at precise locations on, or over one or more areas of, the 3D cartographic surface. Thus, one or more users can be interactively engaged with the 3D-CUI of the system at a time, by controlling switchable and/or variable software routines or parameters from one or more input devices, and by the positioning of one or more input devices as desired on the surface of the 3D-CUI. Preferably the system also provides for the positioning and orientation of one or more graphically depicted elements or software 'objects' on a surface of the 3D-CUI including those providing a software means once moved or positioned, to facilitate user interactivity. For example, one or more graphically depicted palettes can be displayed on the 3D-CUI from which one or more elements or objects can be precisely positioned by a user employing a conventional user input device procedure including but limited to: a Click-and-Drag or Copy-and-Paste action. Additionally, the optional system element(s) can be further be controlled or modified by a user after being positioned on the 3D-CUI, for example, an element or object can be scaled in size, or rotated, or duplicated, deleted, annotated, and so forth.

BRIEF DESCRIPTION OF THE DRAWINGS

FIG. 4A shows a side view of a GSDSO. FIG. 4B shows a top view of the GSDSO depicted in FIG. 4A.

In FIG. 5A, a view shed software object is clicked-on and a 'first click' elsewhere on the 3D-CUI establishes the view shed direction or point of view. In FIG. 5B, the view shed software object is clicked-on and a 'first click' elsewhere on the 3D-CUI establishes a left-most edge of a view shed field of view, and a 'second-click' establishes the right-most edge of a view shed field of view.

DETAILED DESCRIPTION OF THE PREFERRED EMBODIMENTS

Figure 1A:
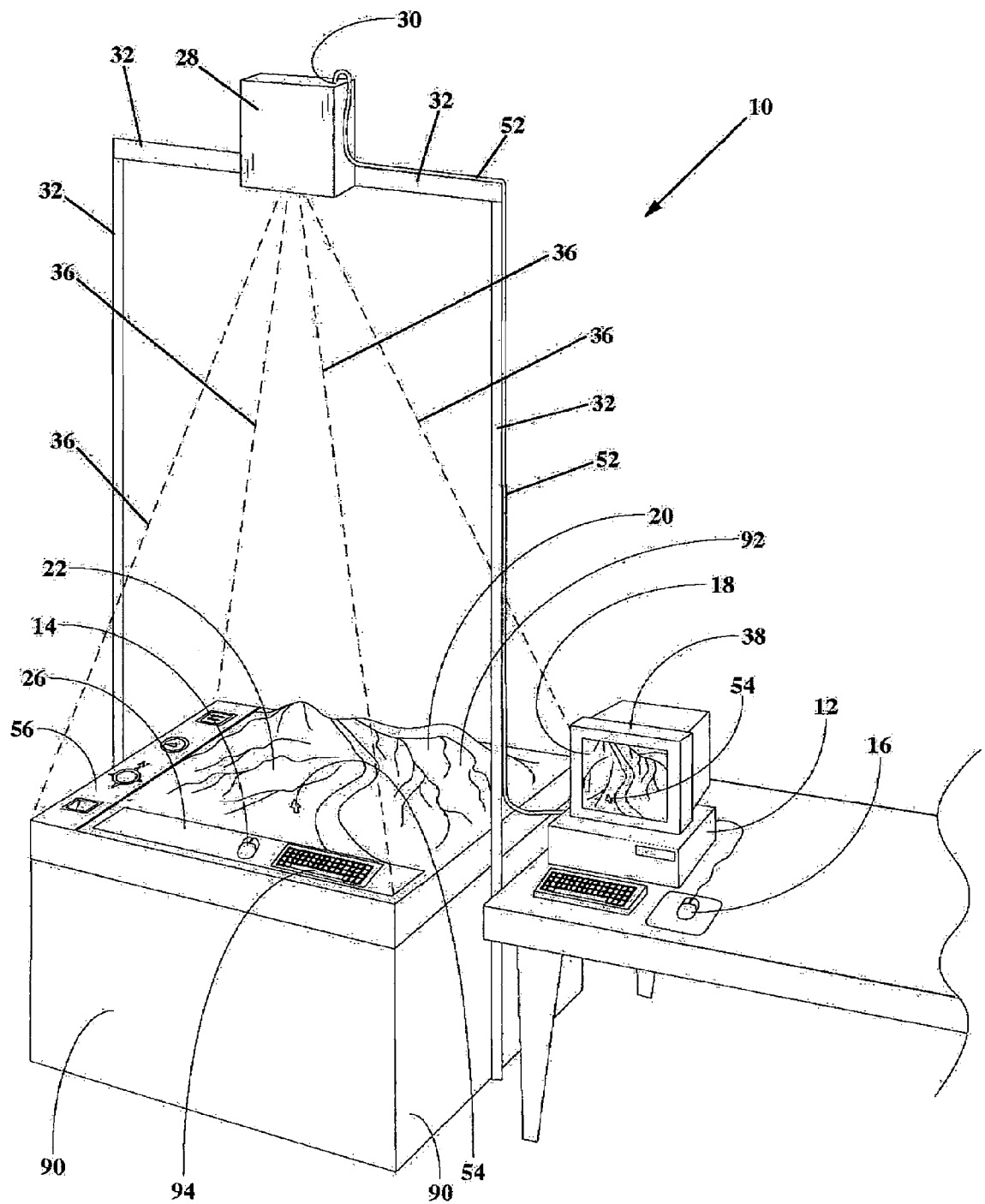
FIG. 1A is a three-dimensional depiction of the cartographic user interface system showing a projected image in dashed-lines being projected downward onto a three-dimensional map surface from a projector mounted above. A computer provides video signal to the projector, and runs a cartographic-related software program.

In FIG. 1A, a depiction of the three-dimensional cartographic user interface system 10 is depicted with a projected image 36 (shown in dashed-lines) being projected downward onto the upper surface 22 of three-dimensional topographical map 20 from a projector 28 mounted above the map. The projector has a video signal input 30 which receives video signal from computer 12 via video cable 52. Alternatively, the system can be equipped with one or more laser projection means which project discernible content comprised of one or more projected laser lights. One or more maps 20 can be mounted in a fixed, or exchangeable, manner on an upper surface of a map stand or map pedestal 90. Preferably, when more than one map 20 is mounted on pedestal 90, the maps are aligned adjacent to one another in a manner having a substantially seamless appearance and suitable for being viewed by and facilitating interactivity with at least one user.

While a single projector is shown in FIG. 1A, it is noted that a plurality of projectors receiving video signal from one or more video cards can alternatively be employed and a plurality of projected images can be aligned adjacent to one another in a tiled fashion by a positioning of each projector and an adjusting of the projected imagery provided by typical projector adjustment means such as "keystoning." In this embodiment of the invention the three-dimensional cartographic computer user interface system is further comprised of one or more video-content adjustment software routines for adjusting the size, shape and registration of the cartographic-related video-projected imagery and the three-dimensional user interface-related content onto one or more surface portions of at least one cartographic map. Preferably, the system includes one or more software video-content adjustment means for ortho-rectifying imagery which is projected onto one or more portions, or all of the 3D-CUI, including one or more video-content adjustment software means for scaling the eye-distance of a perspective view relative to that of the projector-to-model distance. Such software can include one or more commercially-available mapping or visualization software programs. Additionally the latter, or at least one otherwise-produced video-content adjustment software means, preferably provide the means for converting orthophotos into a nadir perspective view.

Figure 1B:
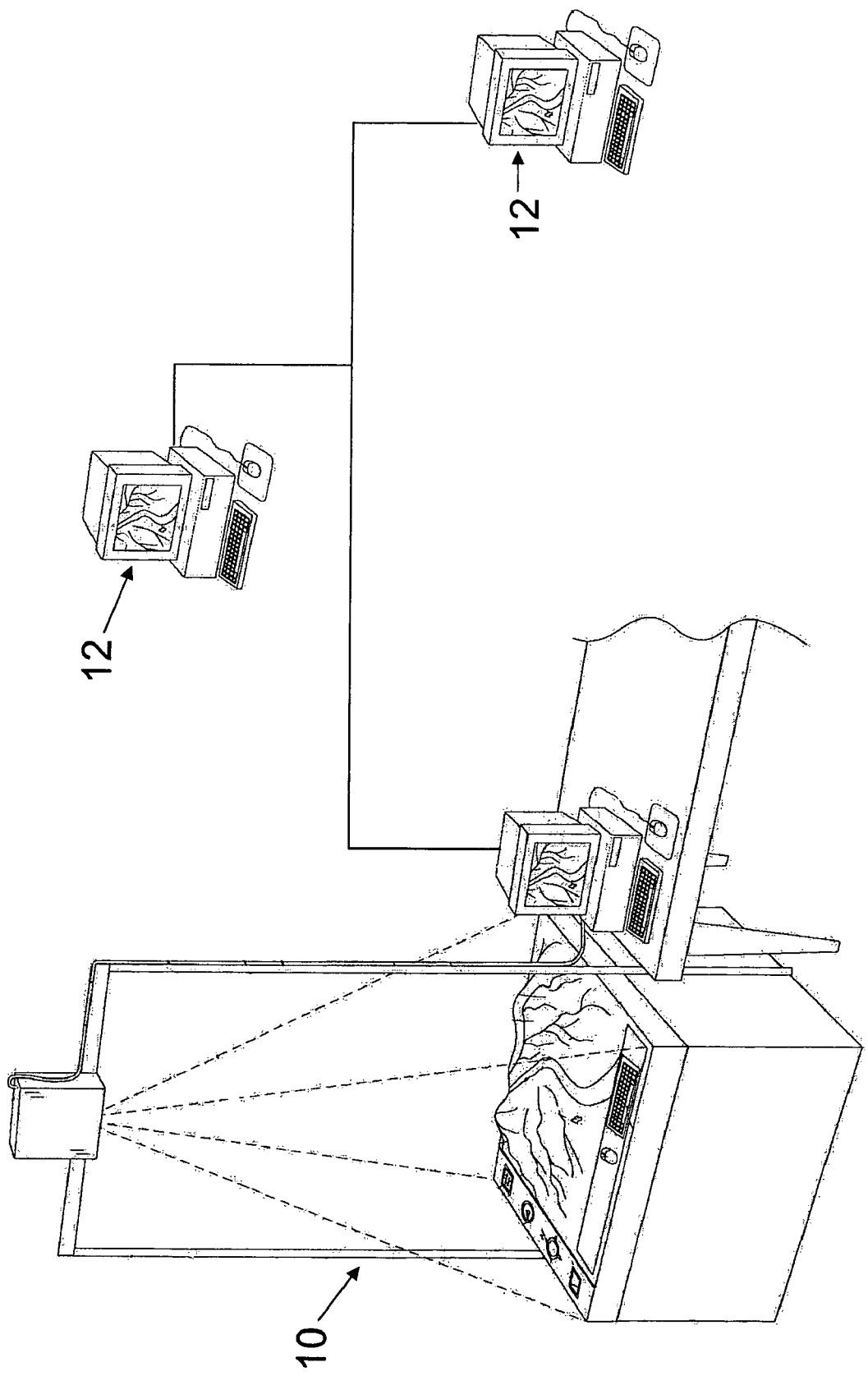
FIG. 1B depicts a network of computers and/or 3D-CUI systems in accordance with one embodiment of the invention.

Optionally, as shown in FIG. 1B, the computer(s) are equipped with network communications means to communicate with one or more other computers 12 or one or more similarly equipped 3D-CUI systems 10 (e.g., at a different location) over a computer network, for example over a WAN, LAN, one or more wireless computer networks, or via a large publicly accessible network such as the Internet. When a plurality of 3D-CUI systems are so-equipped and in communication with one another, the system is preferably equipped with network communications software which allows user input made via a keyboard or an input device 26 or 16 at one location, to be seen and/or to control software commands or cursor movements at one or more other location(s). Additionally, data gathered at, displayable at, or available from, one site, can be transmitted from that location to one or more 3D-CUI systems located elsewhere, and when received, can be projected onto one or more areas of the 3D-CUI(s), and/or displayed on one or more auxiliary monitors 38 in which case, the system is further equipped with at least one video display card and at least one computer monitor and a communications link between the video display card(s) and computer monitor(s).

Referring back to FIG. 1A, the system 10 can also be comprised of one or more computers 12 optionally having an auxiliary computer monitor 38 and optional auxiliary user input device 16. Preferably, when one or more auxiliary monitors are employed by the system, one or more cartographic-related software programs are equipped with routines providing (a) the same or similar display on the monitor(s) as that of the imagery projected on the 3D-CUI or (b) provides a user-selectable, or automated subset or 'Zoomed In' area on one or more monitors which scaled differently relative to imagery projected on the 3D-CUI. Thus, the auxiliary monitor(s) provide a second view port into the data presented by the cartographic-related software, which is useful in a number of scenarios.

For example, the imagery projected on the 3D-CUI may be that of an area where remotely sensed data is being collected, such as a UAV flight video recording of a sequence of video-content imagery captured over a remote landscape. In this example, the cartographic-related software of the system superimposes the position, track and video-camera field of view of the UAV captured video imagery across (and within) the 3D-CUI landscape, while one or more auxiliary monitors simultaneously display the video collected by the UAV video camera. This improves Geo-spatial comprehension, allowing the user to keep track of the context of the video capture relative to the surrounding landscape, helping in the understanding of what they are seeing. Optionally, a border defining the video-camera field of view can be superimposed in either, or both, of the 3D-CUI projected video-content imagery and the video-content imagery displayed in one or more computer monitors.

The computer(s) 12 are equipped with and execute at least one cartographic-related software program 18 having one or more software commands which are responsive to user input received from one or more positionable user input devices 14. The computer(s) 12 are equipped with and execute at least one input device software driver which is responsive to signal received from the user input device(s) 14 preferably in a manner allowing a user to: (a) execute software commands within an operating system, (b) execute one or more commands within any running cartographic-related software program(s), and (c) preferably move a cursor 54 about the three-dimensional cartographic user interface surface of the map and optionally within the window of any program(s) displayed on one or more auxiliary computer monitor(s) 38 when the latter is employed. While the positionable user input device 14 seen in FIG. 1A appears to be of a style similar to a typical computer mouse which communicates with the computer(s) wirelessly or via a mouse cable, it is noted that any one or more in a variety of commercially available input devices can be employed. Input devices among the type which monitor user movements or positioning relative to a working surface, can operate within one or more input device operating areas 26, or projected user interface area(s) 56, either having a planar or near planar surface.

Alternatively, a surface-interactive input device can instead operate over any three-dimensional surface area of the map 20 (i.e., not within any constrained sub-area of the map 20). The upper surface area shown receiving the projected image 36 in FIG. 1A, is hereinafter referred to as the three-dimensional cartographic user interface 92 or '3D-CUI. As other input devices are refined and/or developed, such device(s) can instead, or in addition, communicate through a communications link, wirelessly or through an input device cable, with one or more computer(s) 12.

Figure 1C:
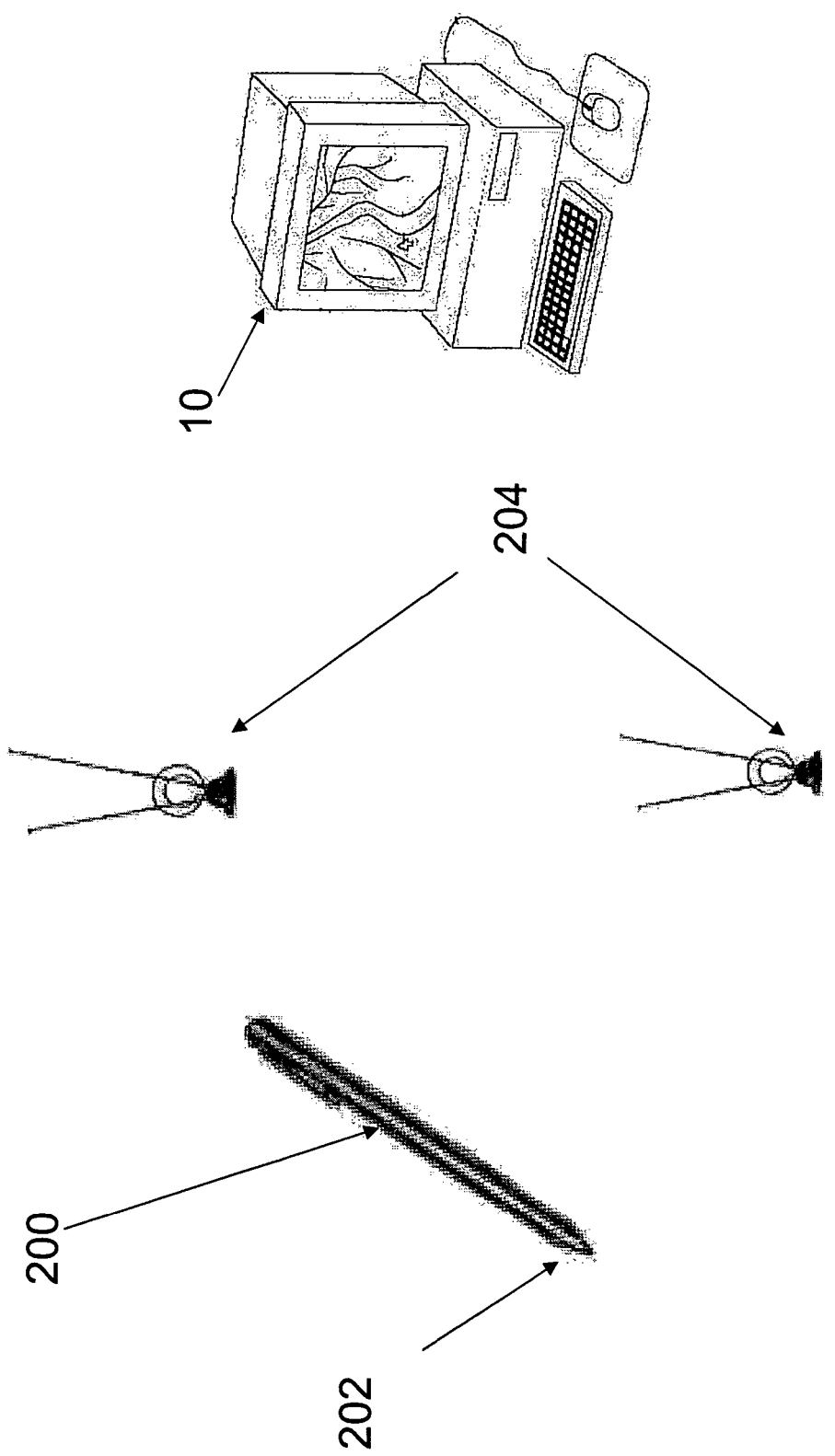
FIG. 1C depicts a stylus and monitoring and reporting means used in one embodiment of the present invention.

For example, as shown in FIG. 1C, a pointing device such as stylus 200 or elongated pointer member (not illustrated) can be equipped with a monitorable element 202 at or near one end which contacts the upper surface of map and a user can move, and the system will track the pointer end as it is moved from place to place, either linearly or non-linearly, or moved to a desired place on the map surface, or within one or more projected user interface area from which one or more commands can be executed. The stylus 200 or pointer end element can be monitored by any commercially-available two-axis, or three-axis pointer or similar computer input device monitoring and/or reporting means 204. For example, the system can accommodate a monitoring means 204 which tracks pointer-end positioning by use of a triangulation of RF signals, or audio signals audible or non-audible to the human ear, or laser signals, and the like. Alternatively, the map, at or near its surface, can include an electronic grid matrix having position-sensing means responsive to the proximity of an end element of a pointer means, or responsive to the touch of a finger tip, to determine X/Y or horizontal/vertical positioning within the grid, and accurately transmitted those positioning via a device driver software means to the computer(s) 12 of the system 10.

The 3D-CUI system accommodates one or more user input devices, and when doing so, the system includes input device position monitoring means for monitoring the positioning of any input device employed, and can do so by employing any in a variety of user input device position monitoring means such as those which are commercially available.

Figure 1D:
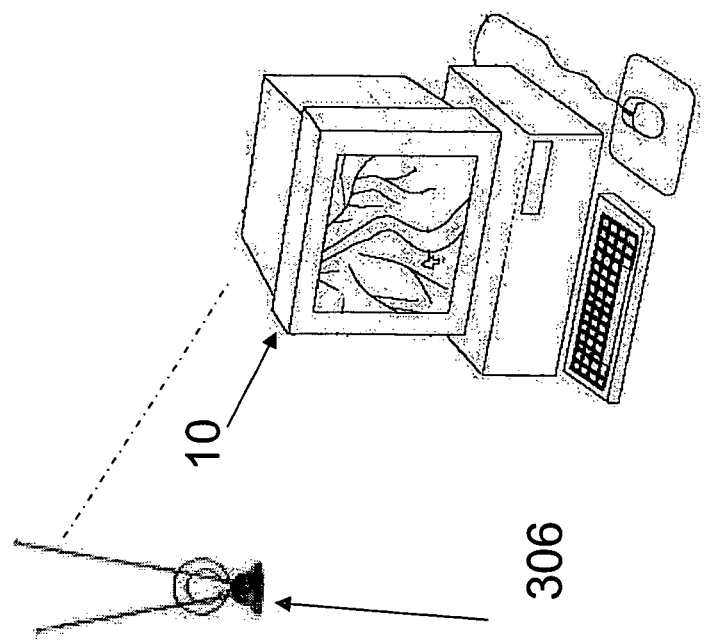
FIG. 1D depicts a laser emitting stylus and monitoring and reporting means used in one embodiment of the present invention.
Figure 1D:
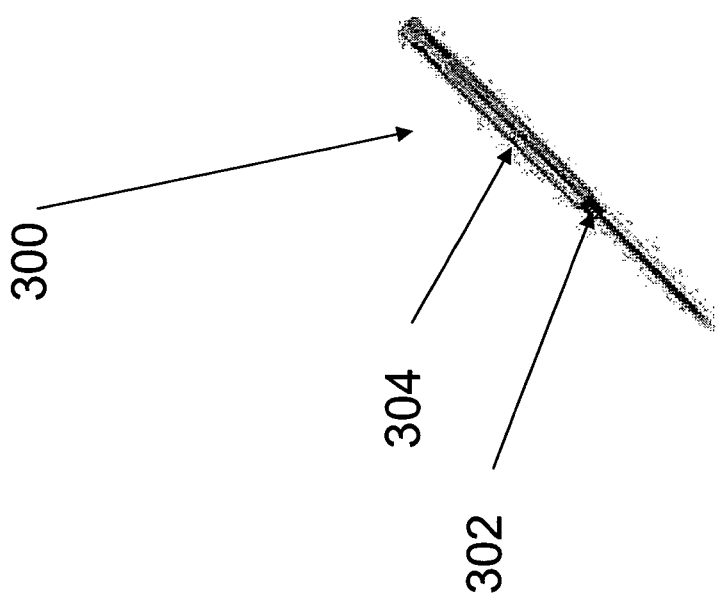

In one embodiment of the invention shown in FIG. 1D, the system is equipped with input device means comprising a hand-held stylus equipped with a laser light-emitting means 302 to provide a wireless light-emitting pointing device. In this embodiment, the stylus is preferably equipped with stylus-orientation monitoring and reporting means 304 equipped to wirelessly transmit stylus 3D orientation-related signals to a receiver 306 interfaced with the system's computer. The stylus-orientation monitoring and reporting means 304 can include sensors suitable for sensing the 3D orientation of the stylus and transmission means for conveying data pertaining thereto. For example, the transmission means can transmit data pertaining to sensing means comprising one or more inclinometers, or a three-axis stylus-orientation reporting means located proximate to one end of the stylus and a three-axis stylus-orientation reporting means located proximate to an opposite end. The handheld stylus input device embodiment further includes signal triangulation means equipped to communicate radio frequency, or light, or sound signal between the three-axis map-orientation reporting means and the three-axis stylus-orientation reporting means, determines the orientations of the two stylus-orientation reporting means relative to the orientation of the surfaces of one or more maps of the 3D-CUI system. Stylus-light direction-calculating software responsive to the stylus and map orientation signals provided by the combination of the stylus-orientation reporting means and the signal triangulation means, calculates where the light emitted from the end of the stylus is located relative to the surface of the 3D user interface when the light of the stylus is turned on by the user. Thus, in this approach, light emitted from the stylus is selectively controllable by the user, and serves as a pointer within the 3D terrain of the user interface and also functions as a cursor with the handheld stylus preferably being equipped with one or more user input device buttons or controllers and the system being equipped with software responsive to such input.

Optionally, or alternatively, one or more other light-sensing and reporting means may be incorporated into the system as 3D-CUI user input devices. For example, one or more map surfaces of the system can include a light-sensing and reporting means such as a grid-array comprising a light-sensitive material which is preferably flexible and which is sensitive to the light intensity and/or light frequency of the light emitted from the handheld stylus input device (e.g., like a CCD, or similar material which is made flexible).

Alternatively, the system can include light-sensing and reporting means comprising one or more video cameras mounted in registration with, and positioned to take in a field of view which includes, the surface of one or more maps of the 3D-CUI, and the system is also equipped with software which is responsive to video signal received via a video signal interface of one or more computers of the system, whereby the software differentiates the light intensity and/or light frequency of the light emitted from the handheld stylus input device to determine the light-location within the 3D terrain of the user interface.

Figure 4A:
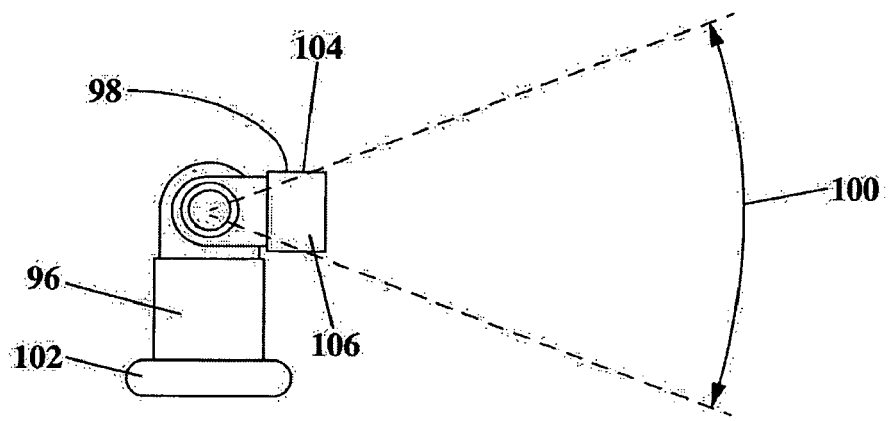
FIGS. 4A and 4B illustrate a physical, geo-spatial data simulation object 'GSDSO,' which is positionable by a user and is optionally equipped with a user or software-motion control positionable member.
Figure 4B:
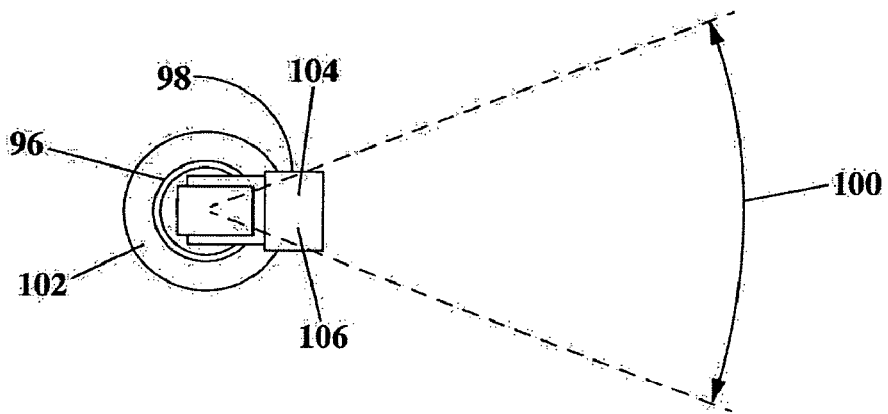

In another embodiment of the invention, the positionable user input device(s) 14 can include one or more three-dimensional, positionable physical map-related 'objects' (such as depicted in FIG. 4A and FIG. 4B), preferably wireless, which can be positioned anywhere on the surface of map 20. Preferably, the objects include electromechanical, electrical, or electro-optical position sensing means which provide a position monitoring and reporting means and functionality such as those provided with conventional computer input devices. The objects may also include one or more additional elements or members which can be articulated by a user or by an electronic motion-controlled servo or stepper motor, controllable by signal received from software controlled by a user. The articulation of the element(s) can be controlled (a) manually by a user, or (b) by motion control software controlling servo or stepper motor electronics, in one or more axes, for example in Pitch, or Roll, or Yaw, axes, or any combination thereof. A positionable element may optionally include a small camera, or light, or L.E.D. When a camera or light is included, preferably means are provided for a user to (a) manually adjust, or (b) via one or more software routine choices and motion-control means similar to those previously described, to make adjustments to: the Field of View, or Point of View, or Pan, or Tilt, or Zoom, and the like, or any combination thereof.

Thus, the system provides user input device position monitoring and reporting means and one or more user input devices are further equipped with multi-axis user input means and multi-axis signal transmission means for conveying multi-axis user input signal to one or more computers via a suitable communications link.

In another embodiment, one or more positionable software objects each comprised of one or more software graphical elements are selectable from a projected display area of the cartographic user interface, for example from one or more user interface object palettes, menus or sub-menus. A software object can be positioned from an object palette within a projected area on the upper surface 22 on map 20, in a typical Cut-and-Paste, or Drag-and-Drop manner similar to a manipulation and/or editing function of drawing objects in a typical image-editing, or drawing, or CAD software program. After a software object has been positioned, it is preferably editable by 3D-CUI system software which provides software object editing means. For example, using a 3D-CUI input device a user can position a cursor over a software object or sprite which can then be clicked on using one or more input device buttons. In one mode this preferably superimposes software anchor points along the perimeter of the object allowing a user to modify the object, for example, to change software object characteristics including but not limited to: scale, rotation, skew, perspective, shape, and the like. In another mode, a software object positioned on the upper surface 22 on map 20, can be clicked on by a user positioning an input device cursor over the object and pressing one or more buttons of an input device, which provides a menu and/or sub-menu object from which any one or more in a variety of software commands can be provided. Such command(s) or routines can include, but are not limited to, those provided in a commercially available image-editing, or drawing, or CAD software program, including one or more commands for entering, or editing, or deleting text within or adjacent to a software object, or command(s) for duplicating and/or deleting the software object(s). Additionally, any selectable and positionable software objects can be labeled with alphanumeric indicia, or symbol(s) or graphic content including, but not limited to titles, or initials, or acronyms, or abbreviations, or labels, or symbols, or graphic content and the like, or any combination thereof, associated with cartographic-related subject matter.

In a projected user interface area 56 seen on the left side of the upper surface 22 of map 20 in FIG. 1A, and on the left side of FIGS. 2A-2D showing screen captures 58 of an optional cartographic-related software program, the system accommodates the projection of an optional graphical depiction of a 'dashboard', instrument panel, or instrument control panel 60 which can include one or more software graphic elements and/or text alphanumeric indicia depicting analog and/or digital information in the displays of one or more simulated instruments or measurement devices. Optionally, a projected computer keyboard 94 or numeric pad can be projected onto any area of the 3D-CUI and optionally on one or more auxiliary computer monitor(s) 38, whereby a user can position a cursor over and click any one key, or sequences of keys, to enter alphanumeric data as desired.

Figure 2A:
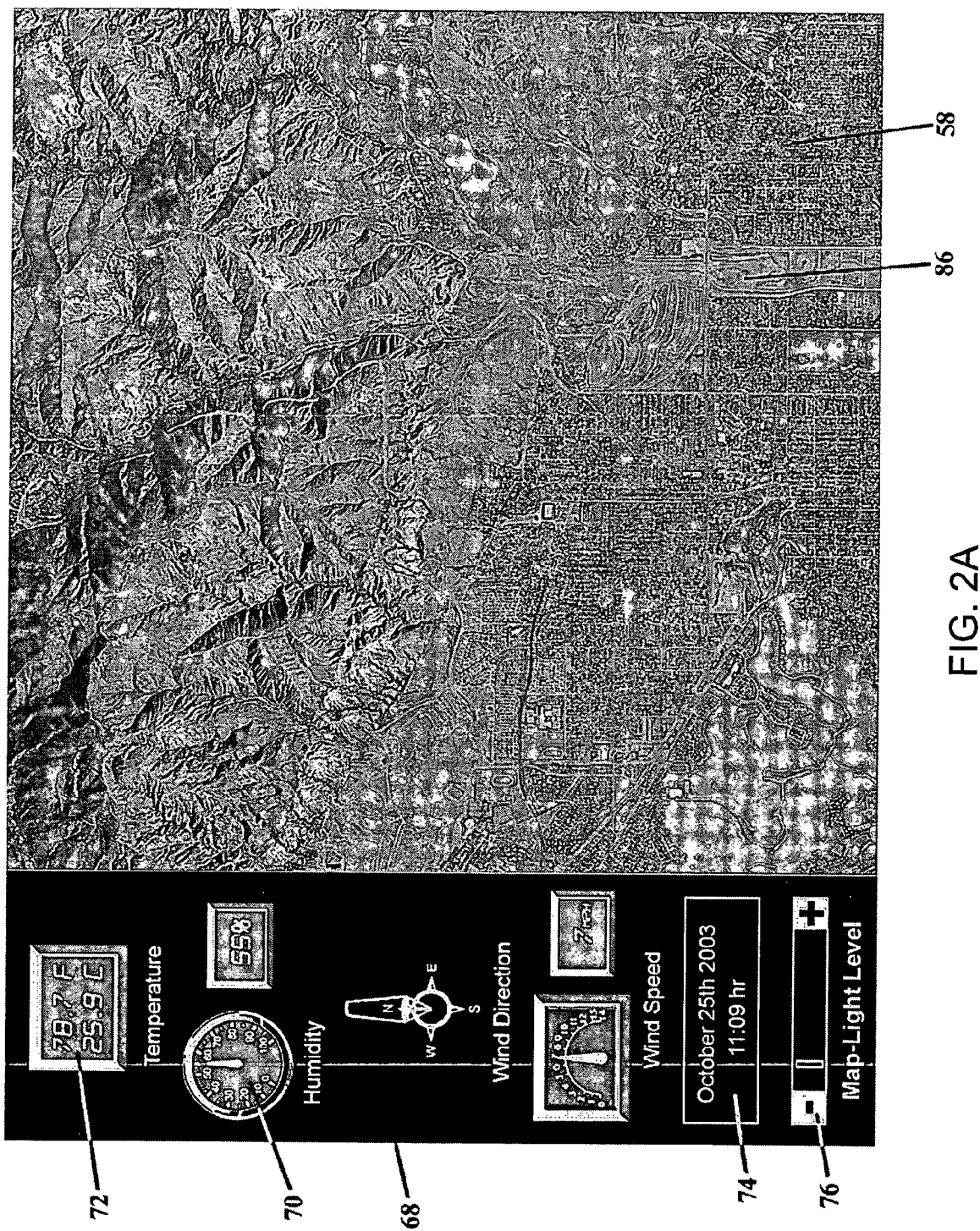
FIGS. 2A, 2B, 2C and 2D are screen captures illustrating some examples of the types of image or imagery content which can be displayed on the system's 3D-CUI when one or more cartographic-related software programs of the system are run on the system's computer(s).
Figure 2B:
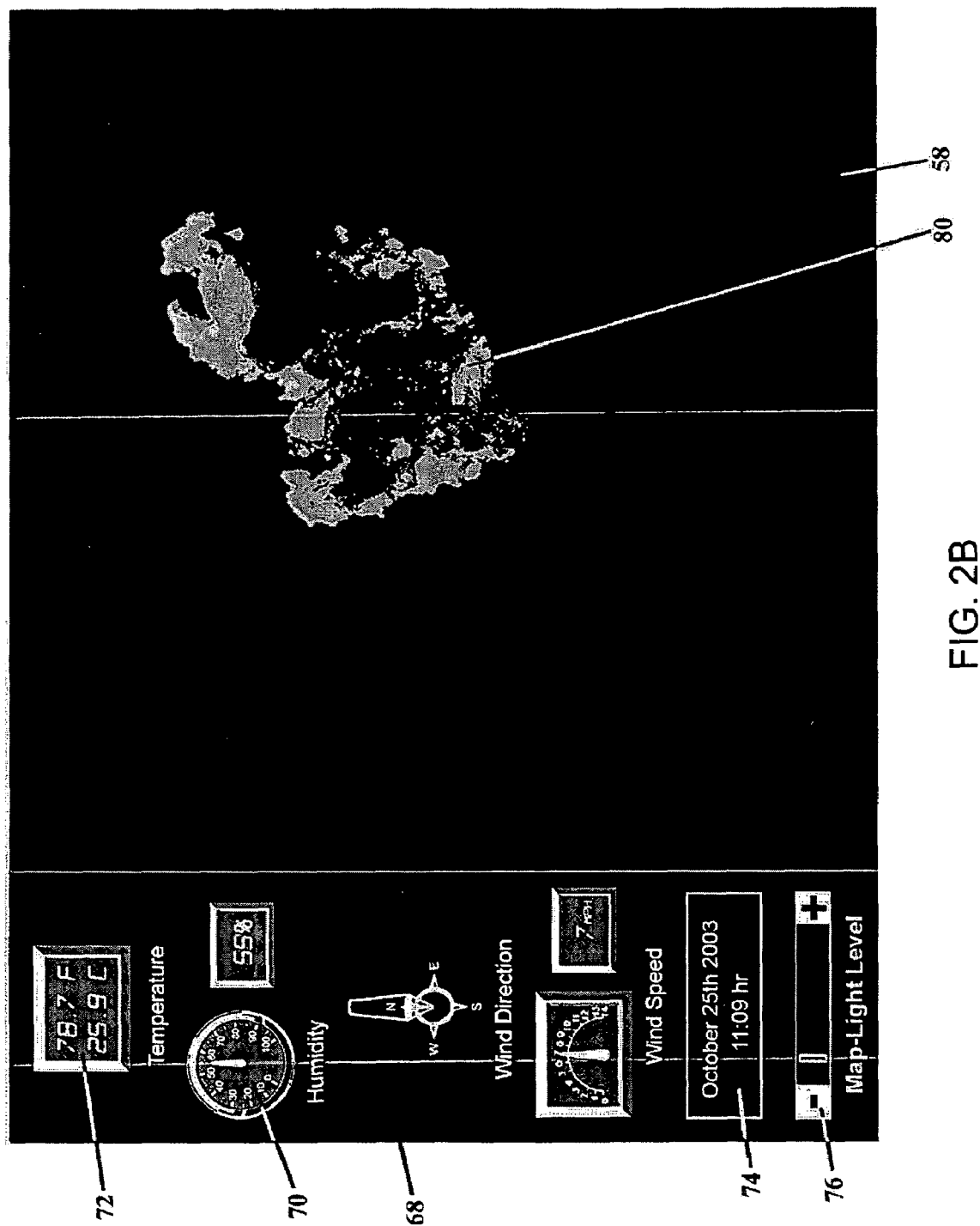
Figure 2C:
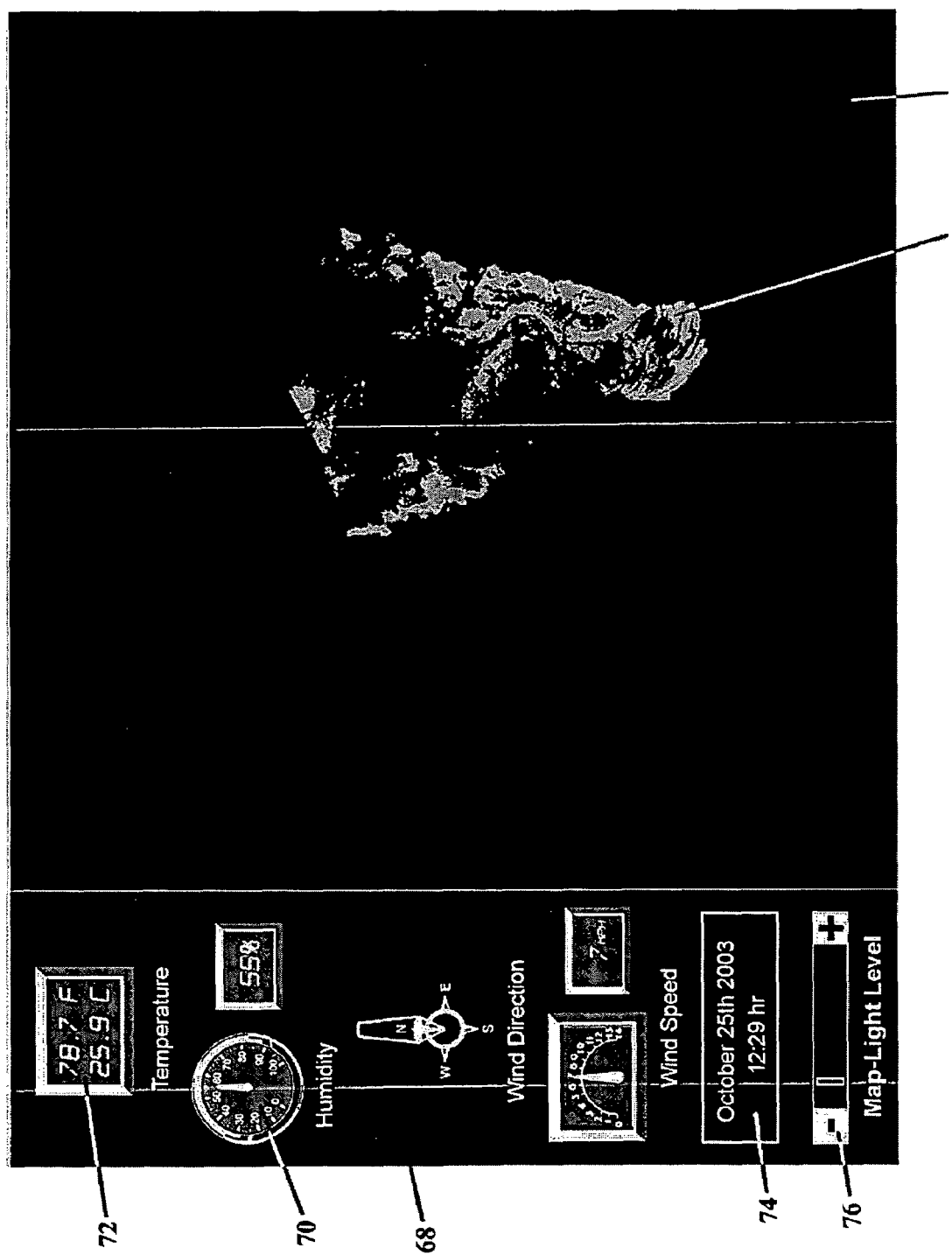
Figure 2D:
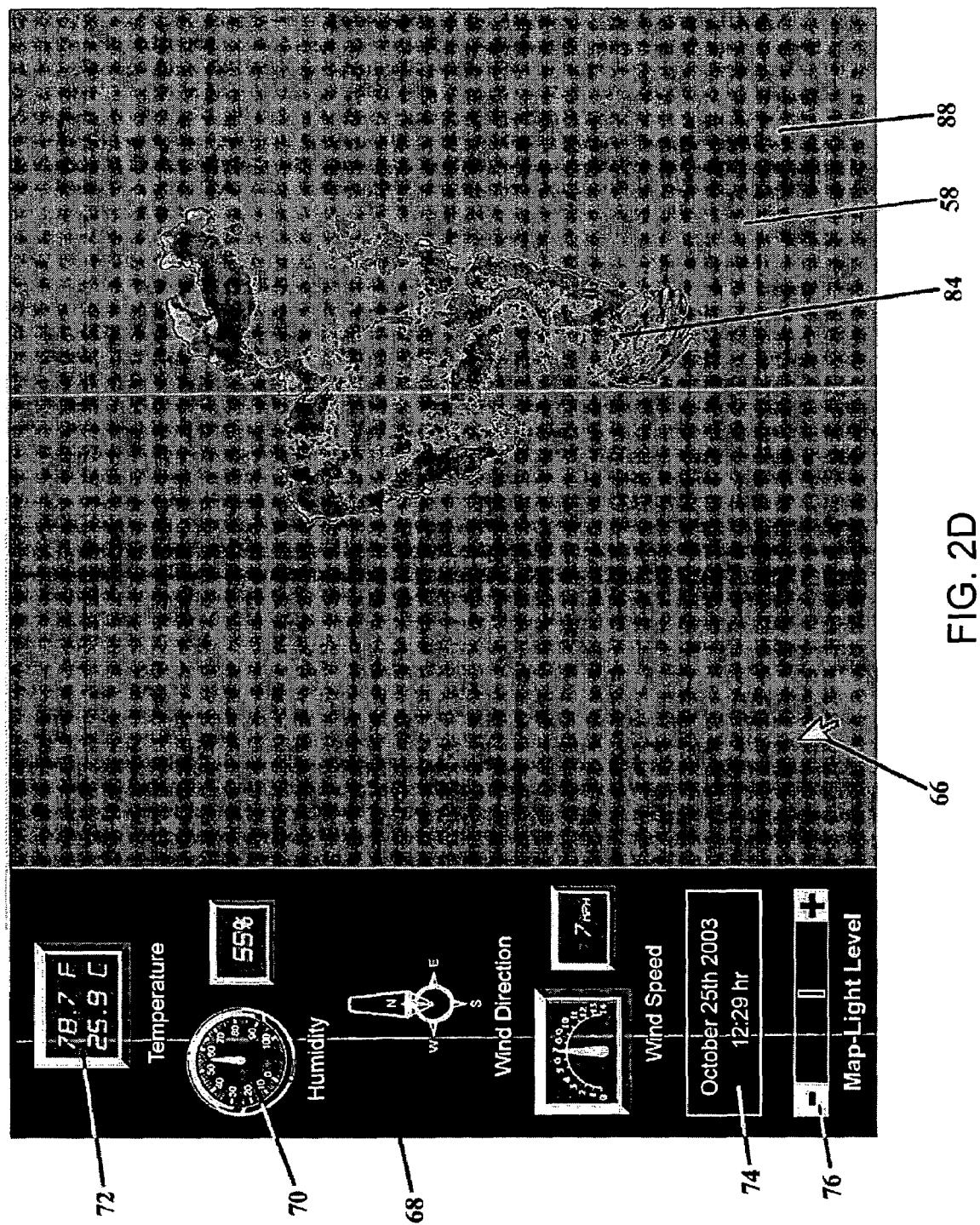

In FIGS. 2A, 2B, 2C and 2D the screen captures 58 illustrate some examples of the types of image content or imagery content which can be displayed on the system's three-dimensional cartographic user interface 92 '3D-CUI' shown in FIG. 1A (and optionally on one or more auxiliary computer monitors 38) when the system projects content from one or more cartographic-related software programs running on the system's computer(s). The areas within each screen capture 58, shown in black, serve as a light mask to mask out or prohibit the passing of projected light onto the upper surface of the 3D-CUI 92 when the image is projected. Preferably, the system computer(s) runs at least one cartographic-related software program providing projected image content having one or more the black areas, adjustable-opacity areas, or adjustable alpha-channels, which, when projected and correctly registered onto a pre-printed fixed or exchangeable map, prohibits the lighting, or provides a range of control of the lighting, adjacent to or surrounding, any projected situation, condition, area(s) of import, or 'footprint,' pertaining to a cartographic-related event. The gray area in FIG. 2D represents an adjusted opacity-level black mask area surrounding a fire 'situation' or 'footprint' (see also, descriptions in reference to FIG. 2D below).

The system's projected imagery content can include color or black and white graphic content or photographic content, including dynamic content. For example, the left side of FIGS. 2A-2D depict a control panel 68 which can include a representation of analog, or digital, or alphanumeric text or indicia, providing cartographic-related content including, but not limited to, static or dynamic information pertaining to an actual real-time, or pre-recorded, or forecasted, or simulated, or time-lapsed, event, and the like, or any combination thereof. For example, the control panel may include a software depiction of one or more analog instrument display(s) 70, or one or more digital instrument display(s) 72, and the like, or any combination thereof.

As previously mentioned, the 3D-CUI 92 can have one or more planar surfaces which accommodates a projected or displayed control panel and serves as a projected informational area of the 3D-CUI, including information pertaining to a map legend. Alternatively, the 3D-CUI can have a control panel area having one or more three-dimensionally formed instrument display contours, for example, the digital instrument display 72 can have a raised border or frame which extends upward from a surrounding planar surface, and the background within the frame can also be raised relative to the planar surface. Similarly, one or more analog instrument display(s) 70 can have a raised rim which extends upward from a surrounding planar surface, and the background within the frame can also be changed in height relative to the planar surface. In each case, where there is a raised background and instrument frame or rim, the system provides for the correct alignment and registration of corresponding projected image content within each 3D instrument display of the 3D-CUI. Although the control panel 68 is shown being aligned vertically, extending from the top of the screen capture to the bottom of the screen in FIGS. 2A-2D, it is noted that a smaller area of the screen could be employed instead, and that the panel could alternatively be aligned differently in the software and when projected onto the 3D-CUI 92.

Optionally, one or more upper surface areas of the 3D-CUI 92 depicting the topography of a geographic location can be made so that the area(s) are unprinted to allow photographic content to be projected on it, such as imagery taken by a satellite camera, or one or more aerial photographic images of a geographic location. The screen capture of the cartographic-related software image in FIG. 2A, is shown incorporating an aerial photograph (shown to the right of the control panel 68). FIGS. 2B-2C depict a sequence of aerially-captured imagery pertaining to an actual fire which occurred in southern California on Oct. 25, 2003. In FIG. 2B, a first fire footprint 80 taken at 11:09 AM is shown, and is surrounded by a black masked-out area so that when the image is projected onto the 3D-CUI 92, no light from the projector lamp is seen surrounding the fire footprint. Optionally the control panel 68 includes a chronographic display 74 to assist in the comprehension of conditions which change relative to elapsed time, or relative to a given date and/or time. Fire footprint 80 is incorporated into the screen capture 58 of FIG. 2B so that it, and its surrounding masked-area(s), are sized and positioned to be projected in proper registration with a pre-printed map mounted on the 3D-CUI system pedestal 90 which represents the same geographical location as the aerial imagery. In FIG. 2C, a second fire footprint 82 taken at 12:29 AM (one hour and twenty minutes later) is also shown surrounded by a black masked-out area, and is sized and positioned to be projected in proper registration with the previously mentioned pre-printed map. In FIG. 2D, a composite fire footprint or cumulative fire footprint 84 representing the combination of footprints 80 and 82 is shown being surrounded by an adjustable-opacity area 88 shown in gray. At the lower end of the control panel 68, an optional map-lighting level adjustment means 76 is shown which, when projected onto the upper surface of the map mounted on map pedestal 90 of the 3D-CUI system, provides means for user to adjust a map lighting level using an input device. Adjustments made to adjustment means 76 determine the opacity level of masked areas which in turn, adjusts the amount of light projected by the lamp of the system's projector(s) in those same areas. Thus, when the 3D-CUI system is in an environment, surrounded by little or no ambient light, it can be difficult to see the map of the system and therefore it may be desirable to light the map area(s) adjacent to any projected dynamic condition so that both are easily seen. By decreasing the opacity of the black masked area(s) to a desired degree or optimal level, the lamp of the projector(s) then increases the lighting of areas adjacent to or surrounding any projected dynamic condition. Conversely, when the 3D-CUI system is in an environment surrounded by moderate to brighter ambient light, it may be desirable to mask the map partially or fully so that the area(s) adjacent to or surrounding any projected dynamic condition, are easily seen in the ambient lighting. In the latter case, an increasing of the opacity of the black masked area(s) to a desired degree or optimal level, causes the lamp of the projector(s) to decrease the lighting of the areas adjacent or surrounding any projected dynamic condition(s).

While adjustment means 76 is shown having opacity-level adjustment means consisting of (i) a plus sign "+" and minus sign "−" buttons which can be clicked-on, and/or (ii) a slideable element which can be clicked-on and slid from side to side, such that either action causes a corresponding change in the opacity level of a masked area, it is noted, that any among a variety of software routine events or variable events, can alternatively be employed to change opacity levels. For example, such events can be generated from a user positioning of a rotatable knob, or from events sent in the form of keyboard commands received from one or more among a sequence of alpha-numeric keys, or the typing in of distinct opacity level or percentage into a data entry cell, the clicking-on or off of one or more radio buttons or check boxes, and so forth.

In one variant of the cartographic-related programs that can be run on the 3D-CUI system, a sequence of two or more images such as the fire footprints in FIG. 2B to FIG. 2C can be instantly composited in response to an event such as the click of a button of a user input device, or a keyboard command. In which case, the software program, provides access to a chronological record of previously displayed images, and a plurality of such images are made viewable or visible in registration with one another and with the surface of the cartographic map when a pre-determined software event, for example a mouse click, occurs within a pre-determined projected image area of the 3D-CUI 92. The net result, is the instant representation of a combined or cumulative, 'footprint' or other cumulative area pertaining to a dynamic condition, relative to a range of time. So, in FIG. 2D, while the second fire footprint 84 is seen as the fire footprint currently being projected onto the map surface of the 3D-CUI, and the earlier, first fire footprint 80 of FIG. 2B is accessible from a stored memory, a user can then click a cursor such as arrow cursor 66 in the projected image area, and the first footprint 80 is instantly retrieved from memory in a manner which makes both footprints viewable simultaneously. Although FIG. 2B-2D illustrate the combining of two images, it is noted that it is also possible to provide dynamic-condition monitoring and display means wherein the monitoring means is comprised of one or more image capture device such as one or more video cameras which capture dynamically changing imagery at one or more physical locations and the display means is comprised of components such as those previously described. Preferably the display means are equipped to display a cumulative 'footprint' or other dynamic condition occurring over time, by combining and showing at the click of a button, a multiplicity of images. Thus, the system can accommodate dynamic-condition monitoring and display means, and software which is responsive to input made by a user from a user input device on an upper surface of one or more cartographic maps, wherein, the display of dynamic imagery captured at one or more physical locations and occurring over a span of time, is controllable by the input and is projected by at least one video-content projection means onto an upper surface of at least one cartographic map. When the dynamic imagery is captured and transmitted live or subsequently transmitted from a remote location, the 3D-CUI is further equipped to receive transmitted video signal and is preferably equipped to access and playback such content from one or more type of storage media.

While the descriptions pertaining to FIGS. 2B-2D refer to a displaying of a sequence of still images, it is noted that a similar approach to the display and/or cumulative combining of images is also possible using dynamic-condition monitoring and display means, wherein black and white or color video content, high definition 'HD' video content, including the use of one or more pre-recorded or real-time video sources, ranging in speed from a user-determined slow-motion or low frame-per-second 'fps' rate, to normal fps rates, or at high-speed or time-lapsed rates. Similarly, the displaying of film converted to video, including video being recorded and/or run at different frame-pre-second rates is also provided. When a video source is accommodated by the 3D-CUI system, the cartographic-related software provides means for receiving video source input and means for sending video which is correctly sized, shaped and registered to one or more projectors. Optionally, the software is also equipped to configure the video for playback and projection into one or more areas of the 3D-CUI 92 and preferably the software provides means for adjusting map-lighting opacity levels in a manner similar to those previously described.

Whether a sequence of still images, or video imagery, is accommodated by the 3D-CUI system, the cartographic-related software preferably provides user time-navigation means for moving quickly to one or more desired points in time. For example, the numeric keys of an actual or projected computer keyboard 94, or in combination with one or more other keys including but not limited to the "Home" or "End" keys, or arrow keys, can be employed to quickly navigate through a range of time. In one variant of the software, the actual or projected numeric keys can represent a percentage of elapsed time wherein pressing the "1" key instantly takes the user to a point 10% of the way into a given time-line, and pressing the "9" key goes to a point 90% into the time-line, and so forth. Thus, a pressing of the keyboard key "5" would take the presentation to a point representing the halfway point of the time-line. Alternatively, any of the slider, or button clicking, or text entry, methods previously described for controlling opacity levels can instead be projected onto the 3D-CUI 92 and interacted with by a user input device as means for achieving easy navigation through time. Preferably, a digital or alphanumeric display similar to chronograph display 74 (used for showing dates and/or times) is also projected onto 3D-CUI 92 and/or is optionally displayed on one or more computer monitors to provide visual chronological feedback, and displays any time desired by and selected by a user.

As previously mentioned, there are many situations where an understanding of an emergency condition can hinge on the ability of a decision maker to quickly comprehend and assimilate geo-spatial information. Rapid understanding of geo-spatial information can also be of critical importance when there is an urgent need to realistically forecast or simulate probable outcomes for a given situation based on one or more known or predictable dynamic factors. For example, it would be reasonable to predict in the sequence of the fire footprint images of FIG. 2B and FIG. 2C with a wind coming from the north, that the fire would move in a southward direction over a mountainous range. And at a click of a button the cumulative effect of the fire over that terrain and over a given timeframe is instantly provided. Thus, geo-spatial comprehension, not requiring a 2D to 3D translation in one's imagination is quickly presented, and an increase in situational awareness in any given moment is achieved when a sequence of fire footprint or other cumulative areas of import, in still images, or pre-recorded or live video imagery, is projected in registration with the topography of the 3D map 20 and is synchronized with dynamic information provided in control panel 68. Preferably, the software includes 'Save' and/or 'Save As' routines for saving projected imagery and any accompanying dynamic data, pertaining to any actual event or simulated event to a storage medium, and also includes 'Open' and/or 'Open As' routines for retrieving such files when desired from the storage medium.

It is noted, that while the sequence of images previously described pertain to an actual or historical event, that the cartographic-related software of the 3D-CUI system can also include access to data, stored in and retrieved from one or more databases of data pertaining to dynamic conditions or known factors from which, any among a variety of forecasts or simulations can be modeled. For example, in the case of a fire occurring in a known geographic location, dynamic conditions such as: wind speeds and directions, air temperatures, times of day, times of month, times of year, seasons, humidity levels, altitudes, elevations, terrain types, soil types, fire temperatures, fuel levels, present fire paths, anticipated fire paths, simulated fire paths, structures in fire paths, fire breaks, fuels, bodies of water, fire suppressant types, fire suppressant locations, water drop locations, and fire crew locations, and so forth. And one or more software routines for quickly selecting or entering any of such data is provided and can be factored into one or more fire simulation models occurring over a user-determined or pre-determined amount of time. Increased situational awareness of a given, potential or anticipated emergency can also be heightened by a computer acceleration of such simulations into a condensed period of time. For example, one or more computer(s) can model and record various scenarios, any of which can be played back from a suitable computer and/or video storage means at normal, quickened or rapid speeds. Similarly, the databased data can include situation-awareness-related data, emergency-awareness-related data, and data pertaining to forecastings, simulations, GIS simulations, and the like.

When a palette, or menu, or sub-menu providing one or more drawing tools is also provided in the cartographic-related software, a user can employ a user-input device to quickly draw one or more hypothetical footprint areas from which one or more criteria and/or dynamic factors manually selected by a user, or automatically selected by the software preferably according to one or more user-entered parameters, can then be used to quickly model probable outcomes. For example, a user can draw an outline approximating the size of one or more initial fire footprints, or the area of an initial spill of hazardous or other material, thereafter, data relative to the location and proximate environmental conditions is manually entered by a user and/or is automatically retrieved by the software and employed by the program to simulate one or more probable outcomes for that terrain during a prescribed or known timeframe.

Similarly, any among a variety of simulations pertaining to various types of emergencies can alternatively be modeled at normal, quickened or rapid speeds, and be recorded and played back as needed via software running on the system's computer(s). For example, the software can provide access to a database of data pertaining to dynamic conditions or factors known to influence any in a variety of simulations including, but not limited to: landslides, avalanches, spills, hurricane or tornado damage, floods, run-offs, glacial movements, overflowing rivers or other bodies of water, the spread of a ground-based or airborne hazardous material, fallout, melt-offs, environmental impact scenarios, military engagements, and so forth. Additionally, the previously mentioned tool palette, or menu, or sub-menu, can include one or more user-selectable drawing tools which allow a user to create and place a dynamic software 'object' at one or more desired locations in registration with the 3D topography of a fixed or exchangeable map. Thereafter, one or more dynamic factors manually selected from or entered into the software by a user, or automatically selected by the software, can then be used to quickly model one or more probable outcomes.

Figure 3:
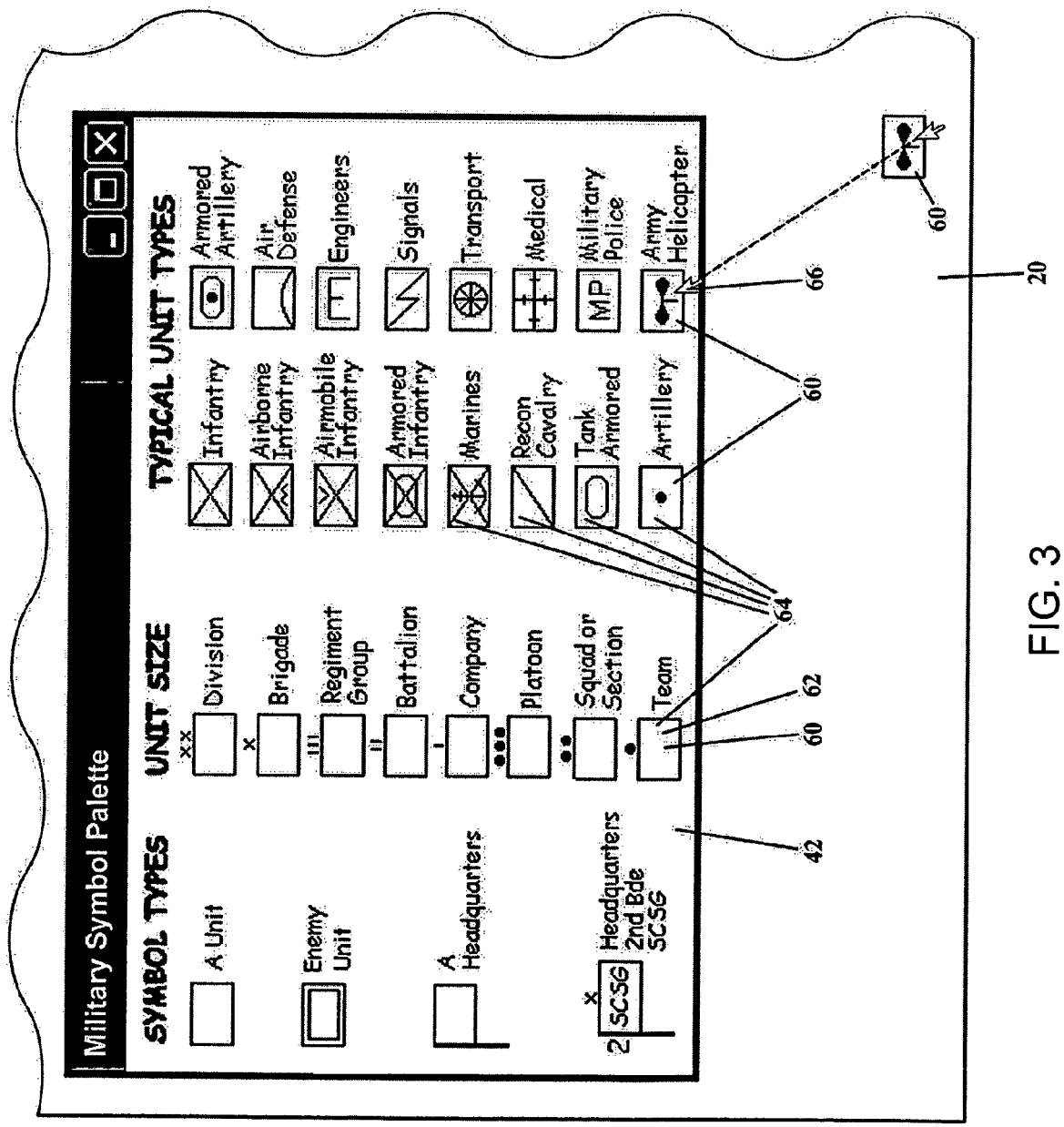
FIG. 3 is a top view of a portion of the upper surface of the map of the 3D-CUI system. A software object-palette is shown being projected onto the upper surface and provides a user-selectable choice of software objects which can be positioned from the palette onto the 3D-CUI and thereafter be modified via one or more software routines.

In FIG. 3, a top view of a portion of the upper surface of the map 20 of the 3D-CUI system is depicted. The system's cartographic-related software optionally includes one or more symbol palettes from which a user can select and position one or more software objects 60 within the projected imagery displayed on the 3D-CUI 92. In FIG. 3, an example of a software object-palette 42 is shown being projected onto the upper surface of map 20 providing a user-selectable choice of software objects 60 or cartographic-related content symbols 62, and in the case of a military symbol palette, providing one or more military-related symbols 64. For ease of reference, the palette 42 of FIG. 3 includes alpha-numeric text, however, it is noted that object palettes 42 can alternatively include just one or more symbols without any text or indicia. FIG. 3 also illustrates a 'Click-and-Drag' or 'Drag-and-Drop' positioning of a software object 60 wherein a user positions a cursor arrow 66 over an software object he or she wishes to select and while clicking on a user input device button simultaneously drags the object to a desired location on the 3D-CUI. A sample Drag-and-Drop procedure is illustrated in FIG. 3, wherein the "Army Helicopter" software object 60 is first clicked-on while in its normal accessible position within palette 42 and then while the user holds down a user input device button, the software object 60 is dragged to a desired location e.g., below and to the right of its palette position (the drag path is illustrated by the dashed-line). Preferably, the object once dragged and dropped, can be clicked-on again, for example by a right mouse button click, wherein a menu, or menu with a sub-menu, provides the user one or more ways, to modify the object via one or more software routines, including but not limited to, any one or more of the object modifying, editing, duplicating, deleting, scaling, rotating, annotating, coloring, and/or drawing methods previously described. Thus, in the case of a map scenario showing an actual or simulated military engagement, numerous symbols can be quickly selected from a "Military Symbol Palette" and positioned anywhere within the map, and once positioned can be re-positioned for example, by a Click-and-Drag method, or easily modified, duplicated or deleted. Alternatively or additionally, the system's software can include means for a user to 'Copy' and 'Paste' one or more desired software objects on the 3D-CUI. For example, a user can click-highlight a desired object and then choose "Copy" from a Menu (or use an optional "Ctrl+C" keyboard command) or right-click a user input device button when a cursor is over a desired object which provides a user the choice to 'Copy' the object. Then the user can move the cursor off of the palette to a desired position on the 3D-CUI and select 'Paste' from a Menu selection or use 'Ctrl+V' to paste the object at the desired position. Optionally, the software provides one or more routines which allow a user to assign one or more linear or non-linear movements to any object within a user-specified time. Preferably the software includes means for any event, scenario or simulation to be saved and played back in a similar manner to those previously described.

Any one or more in a variety of symbol palettes can be included in and/or be importable into, the system's cartographic-related software. Preferably the palette(s) are of a cartographic-related nature and can also include a map legend with one or more symbols that can be positioned and modified as previously described.

Optionally, one or more positionable physical geo-spatial data simulation object(s) as shown in FIGS. 4A and 4B (referred to herein as 'GSDSO'), or one or more software objects (see FIGS. 5A and 5B) are provided by the 3D-CUI system. A positionable object is responsive to, and/or interactive with, cartographic-related software data and/or dynamic data pertaining to its positioning and attitude within a cartographic-related environment and provides a means, responsive to user interactivity, for performing GIS-related analysis and/or simulation(s). One example of a 3D-CUI system cartographic-related positionable object, would be either a 'view shed' software object, or view shed GSDSO, which a user can position within the 3D terrain of the 3D-CUI (a "view shed" in the field of cartography represents one or more areas in a three-dimensional terrain surface which are in a field of view, for example of an observer or a camera, from the vantage point of a particular location, elevation and point of view 'P.O.V' within that terrain). Preferably, the positionable map-related physical object(s) has light adjustment means equipped with view-shed light-shaping means such as apparatus to shape width and/or height of emitted-light in accordance with view-shed data provided by the system's software. The cartographic-related software of the system—based on the relative latitude and longitude positioning of the view shed object(s) in the 3D terrain, and the object's attitude, such as its elevation, rotation, or P.O.V., or angle of view, or field of view, or azimuth, or the like, or any combination thereof, (optionally also including any Pitch, or Yaw, or Roll data)—accesses GIS-databased information pertaining to topography surrounding the object, and accurately calculates the viewable view shed area relative to the surrounding 3D terrain, which can be superimposed into the then-current projected imagery on the upper surface of the 3D-CUI. Preferably the projected view shed area is high-lighted and easily differentiated by a different projected light intensity and/or by a projected outline of the view shed area or other desired marking e.g., including hash marks or a solid color.

Figures 5A, 5B:
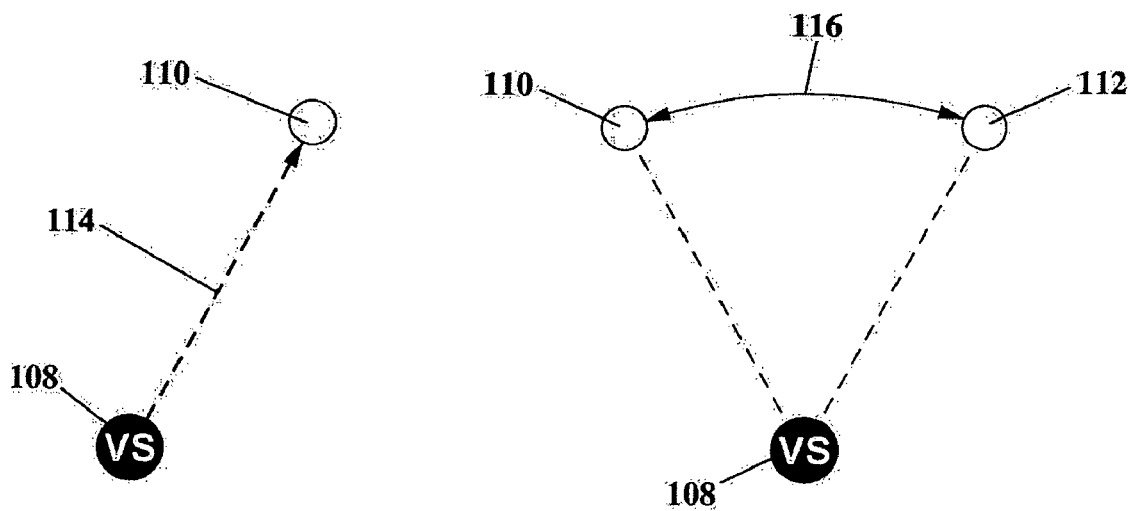
FIGS. 5A and 5B illustrate procedures for clicking on a software object which has been positioned onto the 3D-CUI of the system.

Optionally, the system's software provides one or more routines wherein a software object such as a view shed software object 108 positioned by a user on the surface of the 3D-CUI can be clicked-on and high-lighted to initiate a user interactivity. For example, upon clicking on the object 108, the user can Click-and-Drag from a first click point 110 e.g., determined by a mouse-down event, and drag to a second click point 112 e.g., determined by a mouse-up event, to quickly establish a view path or view shed direction 114 from the object to the second location. Alternatively, a similar Click-and-Drag method could be used for quickly establishing an anticipated direction of movement from another type of software object, for example to simulate the flow of a fluid material, or a fire, over time, from a first user-selected location to a second user-selected location. In the case of the view shed direction 114 data, the cartographic-related software of the 3D-CUI system is preferably equipped with one or more software routines to calculate the area or areas within the 3D terrain that would be viewable from the vantage point of the view shed object 108. Alternatively, the system's software can provide one or more routines wherein a view shed software object positioned on the 3D-CUI can be clicked-on and high-lighted, such that a user can click on, or Click-and-Drag to, a second and third location on the 3D-CUI relative to the view shed object location (e.g., defining a triangular shaped area as depicted in FIG. 5B), to quickly define an object's general field of view 116, or range of view, from which, the program can then calculate and project a view shed area relative to the user-selected, general direction and width of view relative to the selected object.

In FIGS. 4A and 4B a physical, geo-spatial data simulation object 'GSDSO' 96 is depicted having a GSDSO base 102 and alternatively can have adjustable tripod legs (not shown). The GSDSO, or other map-related physical object is positionable by a user anywhere on the 3D-CUI of the system. Preferably the physical object is small in size so as to be easily positioned within the 3D topography of a 3D map, and is equipped to communicate wirelessly with one or more computer(s) 12. Although the GSDSO is shown having a particular shape in FIGS. 4A and 4B, it is noted that GSDSO's having any in a variety of other shapes are also possible. As nano-manufacturing and miniaturizing technologies advance and it becomes easier to produce miniature functional GSDSO's, the 3D-CUI system can accommodate them as they become available and can preferably do so in scale, or near scale, to the scale of the map on which they operate. Optionally, such miniaturization can include electromechanical drive and control means and an electrical power storage means whereby an object, such as a miniaturized land or water vehicle can be self-propelled on the surface of a map of the 3D-CUI system. A GSDSO or physical object can be sized large enough for a user to manually move one or more members thereof, or miniaturized in size and one or more members is controllable via miniaturized motion-control means. Optionally, GSDSO's or physical objects can be equipped with one or more positionable members 98 which can include a positionable or rotatable camera 104 or light 106, L.E.D., light-emitting element, or adjustable light-emitting element. It is noted herein, that when a user-positionable map-related object includes a positionable camera that the map-related object also includes means for transmitting the video signal of the camera via a suitable cabled or wireless communications link between the camera and at least one computer of the three-dimensional cartographic computer user interface system. Other simulation-enhancing features are also possible wherein one or more GSDSO's or physical objects positionable on a 3D-CUI has substance-emission means to emit a smoke, or a fluid or a fine granular material or any combination thereof at a user-determined, or pre-determined, or computer-controllable rate. Preferably the substance-emission means has one or more electro-mechanically actuated pumps or valves which are controllable via software and control means of the 3D-CUI system computer.

As advances in miniaturization techniques allow, the 3D-CUI system can accommodate one or more type of ground-based, or water-traveling, vehicles incorporating a power supply, and made to scale, or near to scale. Such objects can be propelled and accurately positioned on the upper surface of at least one map of the 3D-CUI by electro-mechanical propulsion means and motion-control means responsive to software run on at least one computer of the system. The 3D-CUI system can accommodate one or more of such GSDSO, or other positionable map-related physical objects, as they become available. FIG. 4A shows a side view of a subject GSDSO. FIG. 4B shows a top view of the GSDSO depicted in FIG. 4A. The positionable member 98 is shown having an adjustable range 100 being moveable in two axes, up and down in FIG. 4A, and from side to side in FIG. 4B. However, it is noted that a positionable member 98 can alternatively be positionable in less than, or more than, two axes. Thus when a GSDSO 96 has a communications link with a computer of the system, and is positioned within the terrain of 3D topographical map and an adjustable camera lens and corresponding camera field of view is provided, a vantage point of the camera from a particular location, can quickly be seen on one or more auxiliary computer monitors. Similarly, if a GSDSO 96 is equipped with one or more adjustable lights 106, and is positioned within the terrain of 3D topographical map, the light emitted from the GSDSO and the direction of the light can quickly show a view shed from the GSDSO position.

When a GSDSO member is positionable by motion-control means responsive to software instructions sent to the GSDSO from the system's computer(s) 12, the motion-control means can include any among a variety of commercially-available actuators, including but not limited to one or more: motors, stepper motors, servos, solenoids, piezo elements, or the like or any combination thereof, including linkage components commonly employed with such actuators. Wireless unidirectional or bi-directional communications means that are commercially-available when a 3D-CUI is produced are also employable within GSDSO's and the system's computer(s) 12.

FIGS. 5A and 5B illustrate procedures for clicking on a software object which has been moved from, or copied from, a software object palette and positioned onto the 3D-CUI of the system. Optionally, any software object can include alphanumeric text, or indicia, or abbreviations, or acronyms, or graphical content, and the like, to help easily identify the object. For example, the letters "VS" appear on object 108 as an acronym for "view shed." Additionally, one or more text field is optionally provided which is editable via input from one or more suitable computer input means, including text-only 3D-CUI elements, or other elements such as those previously described also having editable alphanumeric text fields.

The procedure depicted in FIG. 5A, shows a view shed software object 108 is clicked-on, and then a first click point 110 elsewhere on the 3D-CUI instantly establishes the view shed direction 114 or point of view. The procedure depicted in FIG. 5B, shows a view shed software object is clicked-on, and then a first click point 110 elsewhere on the 3D-CUI establishes a left-most edge of a view shed field of view, and a second-click point 112 establishes the right-most edge of a view shed quickly creating field of view 116 range.

Although the present invention has been described in connection with the preferred forms of practicing it, those of ordinary skill in the art will understand that many modifications can be made thereto within the scope of the specification and any claims that follow. Accordingly, it is not intended that the scope of the invention in any way be limited by the above description, but instead be determined entirely by reference to the specification and any claims that follow.

What is claimed is:

1. A three-dimensional cartographic computer user interface system for enhancing geo-spatial comprehension and geographic information system user interactivity, comprising:
    a video-content projector;
    a computer having operating software; said computer being in communication with said video-content projector; and
    a cartographic map comprising:
        a surface portion, wherein the surface portion comprises a three-dimensionally shaped area to represent topographic terrain of a geographical location, and
        a user input device that enables a user to choose a position on the surface portion;
    wherein the cartographic map transmits data pertaining to the chosen position on the map to the computer; and
    wherein said projector displays imagery onto said surface portion of said cartographic map in response to a communication from said computer based on said position chosen on the surface of the map.

2. The three-dimensional cartographic computer user interface system of claim 1 wherein said imagery comprises of cartographic-related video-projected imagery.

3. The three-dimensional cartographic computer user interface system of claim 1 wherein said imagery comprises of three-dimensional user interface-related content.

4. The three-dimensional cartographic computer user interface system of claim 1 further comprising a user input device position monitoring and reporting means and wherein said user input device is selected from a group consisting of computer mice, track balls, track pads, CAD-program input devices, computer keyboards, computer numeric pads, styluses, physical pointing devices, laser pointers, light-emitting pointers, input devices with infrared position-sensing means, positionable geo-spatial data simulation objects with position-sensing means, user input device interaction within a software user interface depiction of a computer keyboard, user input device interaction within a software user interface depiction of a computer numeric pad.

5. The three-dimensional cartographic computer user interface system of claim 2 wherein said software is capable of ortho-rectifying said three-dimensional user interface-related content within said surface portion of said cartographic map.

6. The three-dimensional cartographic computer user interface system of claim 3 wherein said software is capable of ortho-rectifying said cartographic-related video-projected imagery within said surface portion of said cartographic map.

7. The three-dimensional cartographic computer user interface system of claim 2 wherein said cartographic-related video-projected imagery is selected from a group consisting of imagery which is alphanumerical, graphical, pictorial, photographic, vector-based, rasterized, topographical, cartographical, geo-spatial, geological, geographical, oceanographical, distance-related, measurement-related, mineral related, fuel related, slope-related, altitude-related, map legend related, environment-related, atmospheric-related, computer-generated, emergency-specific, hazard-specific, fire-specific, flood-specific, spill-specific, avalanche-specific, battle-specific, location-specific, latitude and longitude data, civil engineering-related, GPS-related, GIS-related, geo-spatial-related, coordinate data, point of view data, or angle of view data, heading data, bearing data, azimuth data, elevation-specific, computer-generated simulation, analysis data, computational data, view shed-related data, view shed-related analysis, land development-related, land management-related, waste-related, hazardous waste management-related, augmented reality 'AR' content, AR data, AR information, legal-related, liability-related, map signs, map symbols, map abbreviations, military-related, non-military-related, paleontology-related, archeology-related, recreation-related, survey-related, inspectorate-related, retrieved from a database, stored on a computer readable storage device, derived from live video transmissions, a graphical depiction of an atmospheric-condition measurement device, a graphical depiction of an atmospheric-condition instrument, a graphical depiction of an instrument panel, a graphical depiction of a thermometer, a graphical depiction of a barometer, a graphical depiction of a directional indicator, a graphical depiction of a wind sock, a graphical depiction of a chronographic device, a graphical depiction of a clock, and indicia.

8. The three-dimensional cartographic computer user interface system of claim 1 further comprising a user-positionable map-related software object.

9. The three-dimensional cartographic computer user interface system of claim 1 further comprising a user-positionable map-related physical object.

10. The three-dimensional cartographic computer user interface system of claim 9 further comprising a physical object position monitoring and reporting means and said user-positionable map-related physical object being further equipped with a user input means.

11. The three-dimensional cartographic computer user interface system of claim 10 wherein said user-positionable map-related physical object has a user positionable member.

12. The three-dimensional cartographic computer user interface system of claim 10 wherein said user-positionable map-related physical object has a motion-control positionable member; said motion-control positionable member being controllable by said computer.

13. The three-dimensional cartographic computer user interface system of claim 12 wherein said motion-control positionable member comprises of a camera and a transmitter for conveying a video signal from said camera to said computer.

14. The three-dimensional cartographic computer user interface system of claim 12 wherein said motion-control positionable member comprises of a light-emitting element.

15. The three-dimensional cartographic computer user interface system of claim 14 wherein said light-emitting element can adjust the amount of light emitted in response to signals from said computer.

16. The three-dimensional cartographic computer user interface system of claim 14 wherein said light adjustment means comprises of a view-shed light-shaping apparatus to shape emitted-light in accordance with view-shed data of said software.

17. The three-dimensional cartographic computer user interface system of claim 3 wherein said software displays and controls said user interface-related content through a graphical representation of a user selectable software menu which is projectable onto a surface portion of said cartographic map of said system, whereby user interactivity within said user selectable software menu with a input device executes a software routine.

18. The three-dimensional cartographic computer user interface system of claim 17 wherein said graphical representation of a user selectable software menu is further comprised of a sub-menu providing a user selectable menu choice, whereby said sub-menu is projectable onto said cartographic map of said system in response to user interactivity with said user selectable software menu from a user input device.

19. The three-dimensional cartographic computer user interface system of claim 3 wherein said software displays and controls said three dimensional user interface related content through a graphical representation of a user selectable software tool which is projectable onto said cartographic map of said system, whereby user interactivity within said graphical representation with a input device executes a software routine.

20. The three-dimensional cartographic computer user interface system of claim 3 wherein said software displays and controls said three dimensional user interface related content through a graphical representation of a of a user selectable software tool palette which is projectable onto said cartographic map of said system, whereby user interactivity within said graphical representation with a input device executes a software routine.

21. The three-dimensional cartographic computer user interface system of claim 1 wherein said surface portion of said cartographic map comprises high-resolution printed content.

22. The three-dimensional cartographic computer user interface system of claim 1 wherein said software provides a positionable computer user interface element within a projectable portion of said cartographic map and said positionable computer user element is movable by a user employing an input device in a conventional click-and-drag manner.

23. The three-dimensional cartographic computer user interface system of claim 1 wherein said software provides a positionable computer user interface element within a projectable portion of said cartographic map and said positionable computer user element is movable by a user employing an input device in a conventional cut-and-paste manner.

24. The three-dimensional cartographic computer user interface system of claim 1 further comprising user input device position monitoring and reporting means wherein said user input device is further equipped with multi-axis user input means and multi-axis signal transmission means for conveying multi-axis user input signal to said computer.

25. The multi-axis user input means of claim 24 wherein said multi-axis user input means is equipped to receive pitch, yaw and roll user input and is equipped to transmit signal pertaining to said pitch, yaw and roll user input.

26. The three-dimensional cartographic computer user interface system of claim 1 wherein said software provides for positioning of an adjustable computer user interface element within a projectable portion of said cartographic map, wherein said adjustable computer user interface element is selected from among the group consisting of knobs, slideable elements and buttons.

27. The three-dimensional cartographic computer user interface system of claim 1 wherein said software provides for positioning of an adjustable computer user interface element within a projectable portion of said cartographic map, wherein said adjustable computer user interface element is switchably controllable via input made by a user from a user input device.

28. The three-dimensional cartographic computer user interface system of claim 1 wherein said software provides for positioning of an adjustable computer user interface element within a projectable portion of said cartographic map, wherein said adjustable computer user interface element is variably controllable via input made by a user from a user input device.

29. The three-dimensional cartographic computer user interface system of claim 1 wherein said software provides for positioning of an adjustable computer user interface element within a projectable portion of said cartographic map, wherein the orientation of said adjustable computer user interface element is controllable via input made by a user from a user input device.

30. The three-dimensional cartographic computer user interface system of claim 1 wherein said software provides for positioning of an adjustable computer user interface element within a projectable portion of said cartographic map, wherein said adjustable computer user interface element is further comprised of an editable alphanumeric text field.

31. The three-dimensional cartographic computer user interface system of claim 1 wherein said software provides a drawing function of a drawing program.

32. The three-dimensional cartographic computer user interface system of claim 1 wherein said software is capable of adjusting the size, shape and registration of said imagery onto said surface portion of said cartographic map.

33. The three-dimensional cartographic computer user interface system of claim 1 wherein said software is capable of converting orthophotos into a nadir perspective view.

34. The three-dimensional cartographic computer user interface system of claim 1 wherein said software is capable of scaling the eye-distance of a perspective view relative to that of the projector-to-model distance.

35. The three-dimensional cartographic computer user interface system of claim 1 further comprising a second projector for projecting cartographic-related video-projected imagery and three-dimensional user interface-related content onto said surface portion of said cartographic map with said first projector in a manner which is substantially seamless in appearance.

36. The three-dimensional cartographic computer user interface system of claim 1 further comprising a second cartographic map adjacent to said first map in a manner which is substantially seamless in appearance.

37. The three-dimensional cartographic computer user interface system of claim 1 further comprising a computer networking means linking a plurality of three-dimensional cartographic computer user interface systems, whereby user interactivity inputted on one system is conveyed via said network communications means to and viewable on another system.

38. The three-dimensional cartographic computer user interface system of claim 37 wherein said software is capable of transferring files between said plurality of three-dimensional cartographic computer user interface systems.

39. The three-dimensional cartographic computer user interface system of claim 37 wherein said networking means comprises of a network selected from the group consisting of WANs, LANs, computer networks, wireless computer networks, large publicly accessible networks, and the internet.

40. The three-dimensional cartographic computer user interface system of claim 1 wherein said computer further comprises a video display card, a computer monitor and a communications link between said video display card and a computer monitor, and said software is capable of scaling imagery displayable on said computer monitor differently from video-image content projected onto said cartographic map.

41. The three-dimensional cartographic computer user interface system of claim 1 wherein said software is capable of providing video content pertaining to the position, track and video-camera field of view of a series of video-content imagery captured from above a landscape, whereby said software superimposes in relative scale, said position, track and video-camera field of view of said series of video-content imagery within said cartographic-related video-projected imagery.

42. The three-dimensional cartographic computer user interface system of claim 41 wherein said software is capable of simultaneously displaying said video-camera field of view on a computer monitor.

43. The three-dimensional cartographic computer user interface system of claim 1 wherein the surface portion of said cartographic map is further comprised of a substantially planar surface area to facilitate positioning of a user input device having a communications link with said computer.

44. The three-dimensional cartographic computer user interface system of claim 1 wherein a surface portion of said cartographic map is further comprised of a substantially planar surface area upon which a control panel element is projected, wherein said control panel element is a among the group consisting of atmospheric-condition measuring instruments, cartographic-related measuring instruments, emergency-condition monitoring and reporting means, clocks, chronographs, calendars, timing apparatus, user input device selectable software tools, user input device selectable tool palettes, user input device cartographic user interface adjustment means, cartographic elements, text, editable alphanumeric text fields, cartographic-related information, map legends, indicia, menus, and sub-menus.

45. The three-dimensional cartographic computer user interface system of claim 43 wherein said substantially planar surface area is further comprised of a control panel element area which is formed at a different height than said substantially planar surface area, wherein said control panel element is projected by said video-content projector into said control panel element area.

46. The three-dimensional cartographic computer user interface system of claim 1 wherein said user input device comprises of an elongated pointer member having a position-sensing means mounted adjacent proximate to one end, and said three-dimensional cartographic computer user interface system further comprising multi-axis pointer monitoring and reporting means, whereby positioning of said one end of said elongated pointer member on the surface of said cartographic map provides multi-axis positioning data which is conveyable via a communications link with said computer.

47. The three-dimensional cartographic computer user interface system of claim 46 wherein said multi-axis pointer monitoring means is equipped to receive and triangulate signals pertaining to the positioning of said one end of said elongated pointer member and equipped with software to calculate multi-axis positioning-related data and display said multi-axis positioning-related data within said cartographic-related video-projected imagery.

48. The three-dimensional cartographic computer user interface system of claim 1 wherein a surface portion of said cartographic map is further comprised of an electronic grid matrix having position-sensing means responsive to the proximity of an end element of a user input device pointer means and said three-dimensional cartographic computer user interface system is equipped with software to calculate multi-axis positioning-related data and display said multi-axis positioning-related data within said cartographic-related video-projected imagery.

49. The three-dimensional cartographic computer user interface system of claim 1 wherein a surface portion of said cartographic map is further comprised of an electronic grid matrix having position-sensing means responsive to the proximity of an end of a user's finger.

50. The three-dimensional cartographic computer user interface system of claim 1 wherein said software provides a user-positionable cartographic map-related object positionable on said surface portion of said cartographic map.

51. The three-dimensional cartographic computer user interface system of claim 4 wherein said computer is capable of receiving data transmitted from said user input device via a wireless communications link.

52. The three-dimensional cartographic computer user interface system of claim 50 further comprising software object editing means having a software object editing routine.

53. The three-dimensional cartographic computer user interface system of claim 52 wherein said software object editing routine is selected from any one or more of a group consisting of: scale, rotation, skew, perspective, shape, duplication, deletion, labeling, image-editing, text-editing within a software object, text-editing adjacent to a software object, an software object editing routine of a drawing program, and software object editing routine of a CAD program.

54. The three-dimensional cartographic computer user interface system of claim 1 further comprising a positionable object having a computer-controllable substance-emission means equipped to emit a substance at a controllable rate wherein said substance is selected from among the group consisting a smoke, a fluid, and a granular material.

55. The three-dimensional cartographic computer user interface system of claim 1 further comprising a positionable object having the appearance of a vehicle wherein said positionable object has a power supply, electro-mechanical propulsion means, and motion-control means responsive to said software.

56. The three-dimensional cartographic computer user interface system of claim 1 wherein said cartographic map has a surface portion incorporating a display comprising a planar pixelated material, wherein said planar pixelated material is selected from the group consisting of: LCD screens, LED screens, plasma screens, television screens, and pixelated material.

57. The three-dimensional cartographic computer user interface system of claim 56 wherein said display is further comprised of touch-sensitive inputting means.

58. The three-dimensional cartographic computer user interface system of claim 1 wherein said portion of said cartographic map is formed of a flexible pixelated material, and said computer having:
  a.) a video display card,
  b.) a communications link between said video display card and said at least one flexible pixelated material, and
  c.) a video-content formatting and display means for sizing, shaping and displaying video content in accordance with the size and shape of said flexible pixelated material.

59. The three-dimensional cartographic computer user interface system of claim 1 further comprising dynamic-condition monitoring and display means, and said software is responsive to input made by a user from a user input device operative on an upper surface of said cartographic map, wherein the display of dynamic imagery captured at one or more physical locations and occurring over a span of time, is controllable by said input and is projected by said video-content projection means onto an upper surface of said cartographic map.

60. The three-dimensional cartographic computer user interface system claim 59 wherein said software is responsive to input made by a user from a user input device operative on an upper surface of said cartographic map, wherein said input controls said display of dynamic imagery captured at one or more physical locations and occurring over a span of time, displaying said dynamic imagery as selected by a user from among a selection of chronological points in time within said span of time.

61. The three-dimensional cartographic computer user interface system of claim 59 wherein said dynamic imagery is selected from a group consisting of: black and white photographic content, time-lapse photographic content, black and white video content, color video content, high definition 'HD' video content, slow-motion video content, high frame rate video content, time-lapse video content, film converted to video content, sequential imagery content, composited imagery content, and cumulative imagery content.

62. The three-dimensional cartographic computer user interface system of claim 1 further comprising a map lighting control wherein a portion of said cartographic-related video-projected imagery is comprised of a mask having an adjustable opacity via said software which is responsive to user input from a user input device, whereby a decreasing of the mask opacity causes an increase of projected light in the masked area of the projected imagery, and conversely, an increase of the mask opacity causes a decrease of projected light in the masked area.

63. The three-dimensional cartographic computer user interface system of claim 1 further comprising a map lighting control wherein a portion of video-projected imagery is comprised of a mask having an opacity adjustment range via said software which is responsive to user input from a user input device, whereby a decreasing of the mask opacity causes an increase of projected light on a upper surface area of said cartographic map to increase the brightness of said upper surface area, and conversely, an increase of the mask opacity causes a decrease of projected light decrease the brightness of said upper surface area, and either type of opacity adjustment can be made by a user to improve said upper surface area visibility according to the then-current ambient light in the viewing environment.

64. The three-dimensional cartographic computer user interface system of claim 1 further comprising a database of data pertaining to a geographical location and said software is capable of accessing said data from said database and displaying said data, wherein said data is selected from a group consisting of: situation-awareness-related data, emergency-awareness-related data, forecasting, simulations, GIS simulations, wind speeds and directions, air temperatures, times of day, times of month, times of year, seasons, humidity levels, altitudes, elevations, terrain types, soil types, fire temperatures, fuel levels, present fire paths, anticipated fire paths, simulated fire paths, structures in fire paths, fire breaks, fuels, bodies of water, fire suppressant types, fire suppressant locations, water drop locations, and fire crew locations.

65. The three-dimensional cartographic computer user interface system of claim 64 further comprising simulation-related data, and drawing software having the functionality of a drawing program, wherein a user selectable software tool of said drawing software provides a drawing functionality whereby a drawing on a portion of an upper surface of said cartographic map can be defined by a user as a simulation point in time, and said software is capable of being responsive to said simulation-related data accessed from said database to cause simulation changes to said drawing over a user-selectable period of time and at user-selectable rates.

66. The three-dimensional cartographic computer user interface system of claim 64 wherein said simulation-related data is selected from a group consisting of: landslides, avalanches, spills, hurricane damage, tornado damage, floods, run-offs, glacial movements, overflowing rivers, overflowing bodies of water, the spread of a ground-based hazardous material, airborne hazardous material, fallout, melt-offs, environmental impact scenarios, and military engagements.

67. The three-dimensional cartographic computer user interface system of claim 1 wherein said user input device comprises of a light-emitting handheld stylus, and said three-dimensional cartographic computer user interface system further comprises stylus-orientation monitoring and reporting means, map-orientation monitoring and reporting means, stylus-light direction-calculating software, and signal triangulation means, whereby stylus-orientation monitoring and reporting means signal and map-orientation monitoring and reporting means signal are monitored by said signal triangulation means, and said stylus-light direction-calculating software is responsive to said signal triangulation means to calculate where light, when emitted from said light-emitting handheld stylus, is located on the surface of the 3D user interface.

68. The three-dimensional cartographic computer user interface system of claim 67 wherein said stylus-orientation monitoring and reporting means signal monitored by said signal triangulation means, is selected from the group consisting of radio frequency signals, light signals and sound signals.

69. The three-dimensional cartographic computer user interface system of claim 67 wherein said map-orientation monitoring and reporting means signal monitored by said signal triangulation means, is selected from the group consisting of radio frequency signals, light signals and sound signals.

70. The three-dimensional cartographic computer user interface system of claim 67 wherein said stylus-orientation monitoring and reporting means signal monitored by said signal triangulation means comprises a three-axis stylus-orientation monitoring and reporting means.

71. The three-dimensional cartographic computer user interface system of claim 67 wherein said stylus-orientation monitoring and reporting means signal monitored by said signal triangulation means comprises an inclinometer.

72. The three-dimensional cartographic computer user interface system of claim 1, wherein said imagery is cartographic-related video-projected imagery and three-dimensional user interface-related content.

* * * * *